United States Patent
Subramanian et al.

(10) Patent No.: US 12,475,082 B2
(45) Date of Patent: Nov. 18, 2025

(54) SYSTEM AND METHOD FOR SYNCHRONIZING DELETE OPERATIONS BETWEEN PRIMARY AND SECONDARY DATABASES

(71) Applicant: Salesforce, Inc., San Francisco, CA (US)

(72) Inventors: Karthik Mohan Subramanian, Sunnyvale, CA (US); Ted Liu, Los Altos, CA (US); Jeffrey Zoch, San Francisco, CA (US); Yeshwant Sai Madanagopal, Fremont, CA (US); Youngjin Yu, Cupertino, CA (US)

(73) Assignee: Salesforce, Inc., San Francisco, CA (US)

(*) Notice: Subject to any disclaimer, the term of this patent is extended or adjusted under 35 U.S.C. 154(b) by 395 days.

(21) Appl. No.: 16/738,415

(22) Filed: Jan. 9, 2020

(65) Prior Publication Data
US 2021/0216502 A1    Jul. 15, 2021

(51) Int. Cl.
G06F 16/16     (2019.01)
G06F 3/06      (2006.01)
G06F 16/27     (2019.01)

(52) U.S. Cl.
CPC ......... *G06F 16/162* (2019.01); *G06F 3/0608* (2013.01); *G06F 3/0652* (2013.01); *G06F 3/067* (2013.01); *G06F 16/27* (2019.01)

(58) Field of Classification Search
CPC ...... G06F 16/162; G06F 16/27; G06F 3/0608; G06F 3/0652; G06F 3/067

USPC .......................................................... 707/689
See application file for complete search history.

(56) References Cited

U.S. PATENT DOCUMENTS

| | | |
|---|---|---|
| 5,577,188 A | 11/1996 | Zhu |
| 5,608,872 A | 3/1997 | Schwartz et al. |
| 5,649,104 A | 7/1997 | Carleton et al. |
| 5,715,450 A | 2/1998 | Ambrose et al. |
| 5,761,419 A | 6/1998 | Schwartz et al. |
| 5,819,038 A | 10/1998 | Carleton et al. |
| 5,821,937 A | 10/1998 | Tonelli et al. |
| 5,831,610 A | 11/1998 | Tonelli et al. |
| 5,873,096 A | 2/1999 | Lim et al. |
| 5,918,159 A | 6/1999 | Fomukong et al. |
| 5,963,953 A | 10/1999 | Cram et al. |
| 6,092,083 A | 7/2000 | Brodersen et al. |
| 6,169,534 B1 | 1/2001 | Raffel et al. |
| 6,178,425 B1 | 1/2001 | Brodersen et al. |
| 6,189,011 B1 | 2/2001 | Lim et al. |
| 6,205,449 B1 * | 3/2001 | Rastogi ............... G06F 11/1471 |

(Continued)

*Primary Examiner* — Tony Mahmoudi
*Assistant Examiner* — Kamal K Dewan
(74) *Attorney, Agent, or Firm* — Kwan & Olynick LLP

(57) ABSTRACT

System and methods are described for synchronization of delete operations between primary a secondary databases. The method includes identifying a chunk of records in a secondary database. The method also includes sending a message to a primary database that identifies the chunk of records and asks whether any records of the chunk records are delete-able. The method also includes receiving a response to the message from the primary database. The response indicates which records of the chunk records are delete-able. The method also includes deleting each record of the chunk of records from the secondary database that the message indicated was delete-able.

21 Claims, 10 Drawing Sheets

(56) References Cited

U.S. PATENT DOCUMENTS

| | | |
|---|---|---|
| 6,216,135 B1 | 4/2001 | Brodersen et al. |
| 6,233,617 B1 | 5/2001 | Rothwein et al. |
| 6,266,669 B1 | 7/2001 | Brodersen et al. |
| 6,295,530 B1 | 9/2001 | Ritchie et al. |
| 6,324,568 B1 | 11/2001 | Diec |
| 6,324,693 B1 | 11/2001 | Brodersen et al. |
| 6,336,137 B1 | 1/2002 | Lee et al. |
| D454,139 S | 3/2002 | Feldcamp |
| 6,367,077 B1 | 4/2002 | Brodersen et al. |
| 6,393,605 B1 | 5/2002 | Loomans |
| 6,405,220 B1 | 6/2002 | Brodersen et al. |
| 6,434,550 B1 | 8/2002 | Warner et al. |
| 6,446,089 B1 | 9/2002 | Brodersen et al. |
| 6,535,909 B1 | 3/2003 | Rust |
| 6,549,908 B1 | 4/2003 | Loomans |
| 6,553,563 B2 | 4/2003 | Ambrose et al. |
| 6,560,461 B1 | 5/2003 | Fomukong et al. |
| 6,574,635 B2 | 6/2003 | Stauber et al. |
| 6,577,726 B1 | 6/2003 | Huang et al. |
| 6,601,087 B1 | 7/2003 | Zhu et al. |
| 6,604,117 B2 | 8/2003 | Lim et al. |
| 6,604,128 B2 | 8/2003 | Diec |
| 6,609,150 B2 | 8/2003 | Lee et al. |
| 6,621,834 B1 | 9/2003 | Scherpbier et al. |
| 6,654,032 B1 | 11/2003 | Zhu et al. |
| 6,665,648 B2 | 12/2003 | Brodersen et al. |
| 6,665,655 B1 | 12/2003 | Warner et al. |
| 6,684,438 B2 | 2/2004 | Brodersen et al. |
| 6,711,565 B1 | 3/2004 | Subramaniam et al. |
| 6,724,399 B1 | 4/2004 | Katchour et al. |
| 6,728,702 B1 | 4/2004 | Subramaniam et al. |
| 6,728,960 B1 | 4/2004 | Loomans |
| 6,732,095 B1 | 5/2004 | Warshavsky et al. |
| 6,732,100 B1 | 5/2004 | Brodersen et al. |
| 6,732,111 B2 | 5/2004 | Brodersen et al. |
| 6,754,681 B2 | 6/2004 | Brodersen et al. |
| 6,763,351 B1 | 7/2004 | Subramaniam et al. |
| 6,763,501 B1 | 7/2004 | Zhu et al. |
| 6,768,904 B2 | 7/2004 | Kim |
| 6,782,383 B2 | 8/2004 | Subramaniam et al. |
| 6,804,330 B1 | 10/2004 | Jones et al. |
| 6,826,565 B2 | 11/2004 | Ritchie et al. |
| 6,826,582 B1 | 11/2004 | Chatterjee et al. |
| 6,826,745 B2 | 11/2004 | Coker et al. |
| 6,829,655 B1 | 12/2004 | Huang et al. |
| 6,842,748 B1 | 1/2005 | Warner et al. |
| 6,850,895 B2 | 2/2005 | Brodersen et al. |
| 6,850,949 B2 | 2/2005 | Warner et al. |
| 7,289,976 B2 | 10/2007 | Kihneman et al. |
| 7,340,411 B2 | 3/2008 | Cook |
| 7,620,655 B2 | 11/2009 | Larsson et al. |
| 2001/0044791 A1 | 11/2001 | Richter et al. |
| 2002/0022986 A1 | 2/2002 | Coker et al. |
| 2002/0029161 A1 | 3/2002 | Brodersen et al. |
| 2002/0029214 A1* | 3/2002 | Yianilos ............ G06F 16/2246 |
| 2002/0029376 A1 | 3/2002 | Ambrose et al. |
| 2002/0035577 A1 | 3/2002 | Brodersen et al. |
| 2002/0042264 A1 | 4/2002 | Kim |
| 2002/0042843 A1 | 4/2002 | Diec |
| 2002/0072951 A1 | 6/2002 | Lee et al. |
| 2002/0082892 A1 | 6/2002 | Raffel et al. |
| 2002/0129352 A1 | 9/2002 | Brodersen et al. |
| 2002/0140731 A1 | 10/2002 | Subramaniam et al. |
| 2002/0143997 A1 | 10/2002 | Huang et al. |
| 2002/0152102 A1 | 10/2002 | Brodersen et al. |
| 2002/0161734 A1 | 10/2002 | Stauber et al. |
| 2002/0162090 A1 | 10/2002 | Parnell et al. |
| 2002/0165742 A1 | 11/2002 | Robins |
| 2003/0004971 A1 | 1/2003 | Gong et al. |
| 2003/0018705 A1 | 1/2003 | Chen et al. |
| 2003/0018830 A1 | 1/2003 | Chen et al. |
| 2003/0066031 A1 | 4/2003 | Laane |
| 2003/0066032 A1 | 4/2003 | Ramachadran et al. |
| 2003/0069936 A1 | 4/2003 | Warner et al. |
| 2003/0070000 A1 | 4/2003 | Coker et al. |
| 2003/0070004 A1 | 4/2003 | Mukundan et al. |
| 2003/0070005 A1 | 4/2003 | Mukundan et al. |
| 2003/0074418 A1 | 4/2003 | Coker |
| 2003/0088545 A1 | 5/2003 | Subramaniam et al. |
| 2003/0120675 A1 | 6/2003 | Stauber et al. |
| 2003/0151633 A1 | 8/2003 | George et al. |
| 2003/0159136 A1 | 8/2003 | Huang et al. |
| 2003/0187921 A1 | 10/2003 | Diec |
| 2003/0189600 A1 | 10/2003 | Gune et al. |
| 2003/0191743 A1 | 10/2003 | Brodersen et al. |
| 2003/0204427 A1 | 10/2003 | Gune et al. |
| 2003/0206192 A1 | 11/2003 | Chen et al. |
| 2003/0225730 A1 | 12/2003 | Warner et al. |
| 2004/0001092 A1 | 1/2004 | Rothwein et al. |
| 2004/0010489 A1 | 1/2004 | Rio |
| 2004/0015981 A1 | 1/2004 | Coker et al. |
| 2004/0027388 A1 | 2/2004 | Berg et al. |
| 2004/0128001 A1 | 7/2004 | Levin et al. |
| 2004/0186860 A1 | 9/2004 | Lee et al. |
| 2004/0193510 A1 | 9/2004 | Catahan, Jr. et al. |
| 2004/0199489 A1 | 10/2004 | Barnes-Leon et al. |
| 2004/0199536 A1 | 10/2004 | Barnes-Leon et al. |
| 2004/0199543 A1 | 10/2004 | Braud et al. |
| 2004/0249854 A1 | 12/2004 | Barnes-Leon et al. |
| 2004/0260534 A1 | 12/2004 | Pak et al. |
| 2004/0260659 A1 | 12/2004 | Chan et al. |
| 2004/0268299 A1 | 12/2004 | Lei et al. |
| 2005/0050555 A1 | 3/2005 | Exley et al. |
| 2005/0091098 A1 | 4/2005 | Brodersen et al. |
| 2009/0019094 A1* | 1/2009 | Lashley ............... G06F 11/2035 707/999.203 |
| 2009/0177744 A1 | 7/2009 | Marlow et al. |
| 2012/0059798 A1* | 3/2012 | Madhavarapu ..... G06F 11/2097 707/655 |
| 2013/0339297 A1* | 12/2013 | Chen ..................... G06F 16/275 707/624 |
| 2013/0339302 A1* | 12/2013 | Zhang ................... G06F 16/275 707/649 |
| 2013/0339303 A1* | 12/2013 | Potter ................... G06F 16/275 707/649 |
| 2014/0279900 A1* | 9/2014 | Gupta ................... G06F 16/219 707/634 |
| 2016/0306837 A1* | 10/2016 | Varley .................. G06F 16/275 |
| 2017/0344442 A1* | 11/2017 | Pawar .................. G06F 16/162 |
| 2017/0351584 A1* | 12/2017 | Griffith .............. G06F 16/2358 |
| 2018/0067662 A1* | 3/2018 | Leshinsky ............ G06F 16/219 |
| 2018/0107704 A1* | 4/2018 | Madhavarapu ..... G06F 16/2365 |
| 2018/0210959 A1* | 7/2018 | Khandelwal ........ G06F 16/2255 |
| 2018/0246947 A1* | 8/2018 | Florendo ............. G06F 16/2379 |
| 2018/0285201 A1* | 10/2018 | Bangalore ........... G06F 11/2097 |
| 2018/0349458 A1* | 12/2018 | Guirguis ............... G06F 16/273 |
| 2019/0095297 A1* | 3/2019 | Neall ................... G06F 11/2082 |
| 2019/0188309 A1* | 6/2019 | Anderson ............... G06F 3/065 |
| 2020/0293213 A1* | 9/2020 | Haridas .................. G06F 3/067 |
| 2023/0350877 A1* | 11/2023 | Kumar .................... G06F 16/27 |

* cited by examiner

SYSTEM AND METHOD FOR SYNCHRONIZING DELETE OPERATIONS BETWEEN PRIMARY AND SECONDARY DATABASES

TECHNICAL FIELD

The field of invention relates generally to the computing sciences, and, more specifically, a system and method for synchronizing delete operations between primary and secondary databases.

BACKGROUND

"Cloud computing" services provide shared resources, software, and information to computers and other devices upon request or on demand. Cloud computing typically involves the over-the-Internet provision of dynamically scalable and often virtualized resources. Technological details can be abstracted from end-users, who no longer have need for expertise in, or control over, the technology infrastructure "in the cloud" that supports them. In cloud computing environments, software applications can be accessible over the Internet rather than installed locally on personal or in-house computer systems. Some of the applications or on-demand services provided to end-users can include the ability for a user to create, view, modify, store and share documents and other files.

The size of data used in the cloud is growing exponentially and maintaining the customer's data availability, consistency and reliability for cloud-based Software-as-a-Service (SaaS) applications is a major challenge. When providing a SaaS-based application in a cloud computing environment, ensuring high availability of customer data and meeting the service level agreements (SLAs) of the customers is a priority.

One area that can be particularly challenging is ensuring data reliability (that is, that stored customer data not be lost) while, at the same time, maintaining high availability and/or access rates. Generally, in order to ensure data reliability, at least one extra copy of a data item is stored so that if a primary version of the data item is lost through a software and/or hardware failure of some kind, there exists at least one backup copy that can be called upon to replace the lost primary version. At the same time, storing one or more backup copies and keeping their state synchronized with their respective primary versions adds overhead to the overall database.

As the sheer storage capacity of the database expands, the ability to implement an effective backup approach that presents modest overhead to the overall system becomes increasingly difficult to achieve.

BRIEF DESCRIPTION OF THE DRAWINGS

The included drawings are for illustrative purposes and serve to provide examples of possible structures and operations for the disclosed inventive systems, apparatus, methods, and computer-readable storage media. These drawings in no way limit any changes in form and detail that may be made by one skilled in the art without departing from the spirit and scope of the disclosed implementations.

DETAILED DESCRIPTION

A database typically includes a primary database for active usage and a secondary database as a backup store. As the storage capacity of the database expands, it becomes difficult to synchronize the respective states of the primary and secondary databases at least for certain operations such as delete operations. The instant application describes a mechanism for synchronizing delete operations between primary and secondary databases that should demonstrate acceptable divergence of state between the primary and secondary databases and acceptable processing burden on the primary database. In order to achieve these improvements the secondary database pro-actively inquires the primary database as to which of the records in the secondary database are delete-able from the perspective of the primary database.

In at least one embodiment, system and methods are described for synchronization of delete operations between primary a secondary databases. The method includes identifying a chunk of records in a secondary database. The method also includes sending a message to a primary database that identifies the chunk of records and asks whether any records of the chunk records are delete-able. The method also includes receiving a response to the message from the primary database. The response indicates which records of the chunk records are delete-able. The method also includes deleting each record of the chunk of records from the secondary database that the message indicated was delete-able.

Figure 1A:
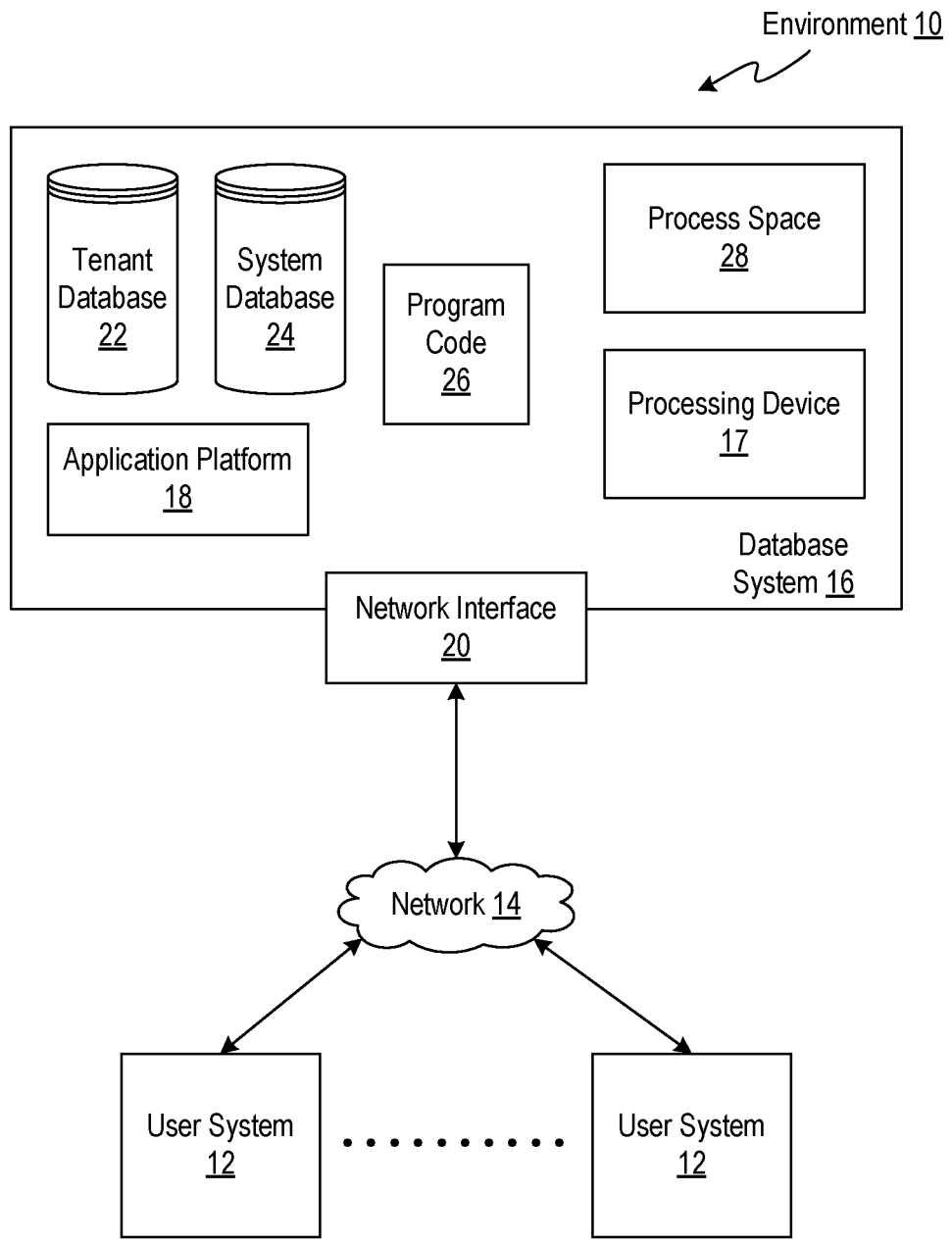
FIG. 1A illustrates an example computing environment of an on-demand database service according to some embodiments.

FIG. 1A illustrates a block diagram of an example of a cloud computing environment 10 in which an on-demand database service can be used in accordance with some implementations. Environment 10 includes user systems 12 (e.g., customer's computing systems), a network 14, a database system 16 (also referred to herein as a "cloud-based system" or a "cloud computing system"), a processing device 17, an application platform 18, a network interface 20, a tenant database 22 for storing tenant data (such as data sets), a system database 24 for storing system data, program code 26 for implementing various functions of the database system 16 (including a visual data cleaning application), and process space 28 for executing database system processes and tenant-specific processes, such as running applications for customers as part of an application hosting service. In some other implementations, environment 10 may not have all these components or systems, or may have other components or systems instead of, or in addition to, those listed above. In some embodiments, tenant database 22 is a shared storage.

In some implementations, environment 10 is a computing environment in which an on-demand database service (such as a distributed search application) exists. An on-demand database service, such as that which can be implemented using database system 16, is a service that is made available to users outside an enterprise (or enterprises) that owns, maintains, or provides access to database system 16. As described above, such users generally do not need to be concerned with building or maintaining database system 16. Instead, resources provided by database system 16 may be available for such users' use when the users need services provided by database system 16; that is, on the demand of the users. Some on-demand database services can store information from one or more tenants into tables of a common database image to form a multi-tenant database system (MTS). The term "multi-tenant database system" can refer to those systems in which various elements of hardware and software of a database system may be shared by one or more customers or tenants. For example, a given application server may simultaneously process requests for a large number of customers, and a given database table may store rows of data for a potentially much larger number of customers. A database image can include one or more database objects. A relational database management system (RDBMS) or the equivalent can execute storage and retrieval of information against the database object(s).

Application platform 18 can be a framework that allows the applications of database system 16 to execute, such as the hardware or software infrastructure of database system 16. In some implementations, application platform 18 enables the creation, management and execution of one or more applications developed by the provider of the on-demand database service, users accessing the on-demand database service via user systems 12, or third-party application developers accessing the on-demand database service via user systems 12.

In some embodiments, application platform 18 includes a system for automated database replication and testing as described herein.

In some implementations, database system 16 implements a web-based customer relationship management (CRM) system. For example, in some such implementations, database system 16 includes application servers configured to implement and execute CRM software applications as well as provide related data, code, forms, renderable web pages, and documents and other information to and from user systems 12 and to store to, and retrieve from, a database system related data, objects, and World Wide Web page content. In some MTS implementations, data for multiple tenants may be stored in the same physical database object in tenant database 22. In some such implementations, tenant data is arranged in the storage medium(s) of tenant database 22 so that data of one tenant is kept logically separate from that of other tenants so that one tenant does not have access to another tenant's data, unless such data is expressly shared. Database system 16 also implements applications other than, or in addition to, a CRM application. For example, database system 16 can provide tenant access to multiple hosted (standard and custom) applications, including a CRM application. User (or third-party developer) applications, which may or may not include CRM, may be supported by application platform 18. Application platform 18 manages the creation and storage of the applications into one or more database objects and the execution of the applications in one or more virtual machines in the process space of database system 16.

According to some implementations, each database system 16 is configured to provide web pages, forms, applications, data, and media content to user (client) systems 12 to support the access by user systems 12 as tenants of database system 16. As such, database system 16 provides security mechanisms to keep each tenant's data separate unless the data is shared. If more than one MTS is used, they may be located in close proximity to one another (for example, in a server farm located in a single building or campus), or they may be distributed at locations remote from one another (for example, one or more servers located in city A and one or more servers located in city B). As used herein, each MTS could include one or more logically or physically connected servers distributed locally or across one or more geographic locations. Additionally, the term "server" is meant to refer to a computing device or system, including processing hardware and process space(s), an associated storage medium such as a memory device or database, and, in some instances, a database application, such as an object-oriented database management system (OODBMS), a relational database management system (RDBMS), or an unstructured DB such as "noSQL" as is well known in the art. It should also be understood that "server system", "server", "server node", and "node" are often used interchangeably herein. Similarly, the database objects described herein can be implemented as part of a single database, a distributed database, a collection of distributed databases, a database with redundant online or offline backups or other redundancies, etc., and can include a distributed database or storage network and associated processing intelligence.

Network 14 can be or include any network or combination of networks of systems or devices that communicate with one another. For example, network 14 can be or include any one or any combination of a local area network (LAN), wide area network (WAN), telephone network, wireless network, cellular network, point-to-point network, star network, token ring network, hub network, or other appropriate configuration. Network 14 can include a Transfer Control Protocol and Internet Protocol (TCP/IP) network, such as the global internetwork of networks often referred to as the "Internet" (with a capital "I"). The Internet will be used in many of the examples herein. However, it should be understood that the networks that the disclosed implementations can use are not so limited, although TCP/IP is a frequently implemented protocol.

User systems 12 (e.g., operated by customers) can communicate with database system 16 using TCP/IP and, at a higher network level, other common Internet protocols to communicate, such as the Hyper Text Transfer Protocol (HTTP), Hyper Text Transfer Protocol Secure (HTTPS), File Transfer Protocol (FTP), Apple File Service (AFS), Wireless Application Protocol (WAP), Secure Sockets layer (SSL) etc. In an example where HTTP is used, each user system 12 can include an HTTP client commonly referred to as a "web browser" or simply a "browser" for sending and receiving HTTP signals to and from an HTTP server of the database system 16. Such an HTTP server can be implemented as the sole network interface 20 between database system 16 and network 14, but other techniques can be used in addition to or instead of these techniques. In some implementations, network interface 20 between database system 16 and network 14 includes load sharing functionality, such as round-robin HTTP request distributors to balance loads and distribute incoming HTTP requests evenly over a number of servers. In MTS implementations, each of the servers can have access to the MTS data; however, other alternative configurations may be used instead.

User systems 12 can be implemented as any computing device(s) or other data processing apparatus or systems usable by users to access database system 16. For example, any of user systems 12 can be a desktop computer, a work station, a laptop computer, a tablet computer, a handheld computing device, a mobile cellular phone (for example, a "smartphone"), or any other Wi-Fi-enabled device, WAP-enabled device, or other computing device capable of interfacing directly or indirectly to the Internet or other network. When discussed in the context of a user, the terms "user system," "user device," and "user computing device" are used interchangeably herein with one another and with the term "computer." As described above, each user system 12 typically executes an HTTP client, for example, a web browsing (or simply "browsing") program, such as a web browser based on the WebKit platform, Microsoft's Internet Explorer browser, Netscape's Navigator browser, Opera's browser, Mozilla's Firefox browser, Google's Chrome browser, or a WAP-enabled browser in the case of a cellular phone, personal digital assistant (PDA), or other wireless device, allowing a user (for example, a subscriber of on-demand services provided by database system 16) of user system 12 to access, process, and view information, pages, and applications available to it from database system 16 over network 14.

Each user system 12 also typically includes one or more user input devices, such as a keyboard, a mouse, a trackball, a touch pad, a touch screen, a pen or stylus, or the like, for interacting with a graphical user interface (GUI) provided by the browser on a display (for example, a monitor screen, liquid crystal display (LCD), light-emitting diode (LED) display, etc.) of user system 12 in conjunction with pages, forms, applications, and other information provided by database system 16 or other systems or servers. For example, the user interface device can be used to access data and applications hosted database system 16, and to perform searches on stored data, or otherwise allow a user to interact with various GUI pages that may be presented to a user. As discussed above, implementations are suitable for use with the Internet, although other networks can be used instead of or in addition to the Internet, such as an intranet, an extranet, a virtual private network (VPN), a non-TCP/IP based network, any LAN or WAN or the like.

The users of user systems 12 may differ in their respective capacities, and the capacity of a particular user system 12 can be entirely determined by permissions (permission levels) for the current user of such user system. For example, where a salesperson is using a particular user system 12 to interact with database system 16, that user system can have the capacities allotted to the salesperson. However, while an administrator is using that user system 12 to interact with database system 16, that user system can have the capacities allotted to that administrator. Where a hierarchical role model is used, users at one permission level can have access to applications, data, and database information accessible by a lower permission level user, but may not have access to certain applications, database information, and data accessible by a user at a higher permission level. Thus, different users generally will have different capabilities with regard to accessing and modifying application and database information, depending on the users' respective security or permission levels (also referred to as "authorizations").

According to some implementations, each user system 12 and some or all of its components are operator-configurable using applications, such as a browser, including computer code executed using a central processing unit (CPU), such as a Core® processor commercially available from Intel Corporation or the like. Similarly, database system 16 (and additional instances of an MTS, where more than one is present) and all of its components can be operator-configurable using application(s) including computer code to run using processing device 17, which may be implemented to include a CPU, which may include an Intel Core® processor or the like, or multiple CPUs. Each CPU may have multiple processing cores.

Database system 16 includes non-transitory computer-readable storage media having instructions stored thereon that are executable by or used to program a server or other computing system (or collection of such servers or computing systems) to perform some of the implementation of processes described herein. For example, program code 26 can include instructions for operating and configuring database system 16 to intercommunicate and to process web pages, applications (including visual data cleaning applications), and other data and media content as described herein. In some implementations, program code 26 can be downloadable and stored on a hard disk, but the entire program code, or portions thereof, also can be stored in any other volatile or non-volatile memory medium or device as is well known, such as a read-only memory (ROM) or random-access memory (RAM), or provided on any media capable of storing program code, such as any type of rotating media including floppy disks, optical discs, digital video discs (DVDs), compact discs (CDs), micro-drives, magneto-optical discs, magnetic or optical cards, nanosystems (including molecular memory integrated circuits), or any other type of computer-readable medium or device suitable for storing instructions or data. Additionally, the entire program code, or portions thereof, may be transmitted and downloaded from a software source over a transmission medium, for example, over the Internet, or from another server, as is well known, or transmitted over any other existing network connection as is well known (for example, extranet, virtual private network (VPN), local area network (LAN), etc.) using any communication medium and protocols (for example, TCP/IP, HTTP, HTTPS, Ethernet, etc.) as are well known. It will also be appreciated that computer code for the disclosed implementations can be realized in any programming language that can be executed on a server or other computing system such as, for example, C, C++, HTML, any other markup language, Java™, JavaScript, ActiveX, any other scripting language, such as VBScript, and many other programming languages as are well known.

Figure 1B:
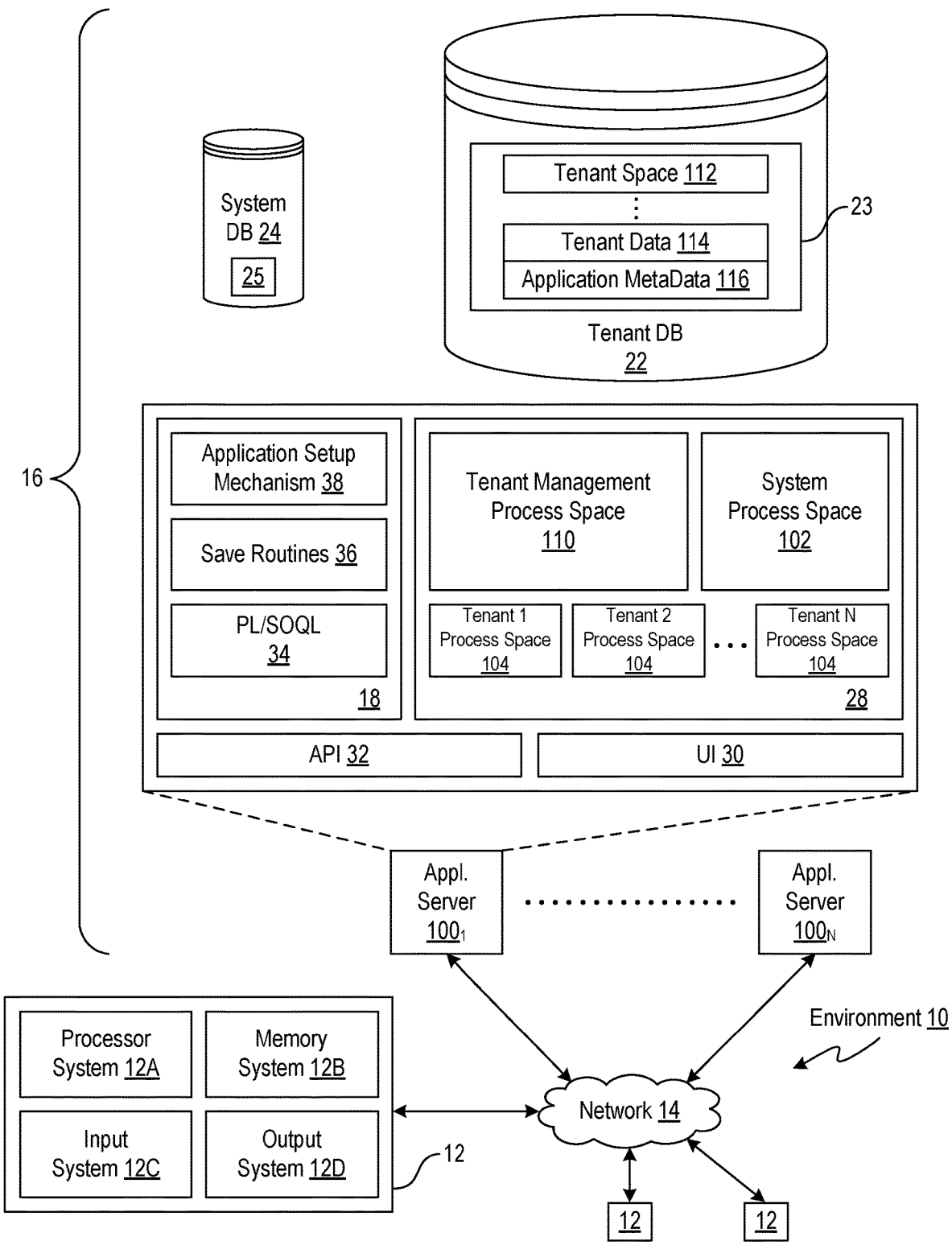
FIG. 1B illustrates example implementations of elements of FIG. 1A and example interconnections between these elements according to some embodiments.

FIG. 1B illustrates a block diagram of example implementations of elements of FIG. 1A and example interconnections between these elements according to some implementations. That is, FIG. 1B also illustrates environment 10, but in FIG. 1B, various elements of database system 16 and various interconnections between such elements are shown with more specificity according to some more specific implementations. In some implementations, database system 16 may not have the same elements as those described herein or may have other elements instead of, or in addition to, those described herein.

In FIG. 1B, user system 12 includes a processor system 12A, a memory system 12B, an input system 12C, and an output system 12D. The processor system 12A can include any suitable combination of one or more processors. The memory system 12B can include any suitable combination of one or more memory devices. The input system 12C can include any suitable combination of input devices, such as one or more touchscreen interfaces, keyboards, mice, trackballs, scanners, cameras, or interfaces to networks. The output system 12D can include any suitable combination of output devices, such as one or more display devices, printers, or interfaces to networks.

In FIG. 1B, network interface 20 is implemented as a set of HTTP application servers $100_1$-$100_N$. Each application server 100, also referred to herein as an "app server," is configured to communicate with tenant database 22 and tenant data 23 stored therein, as well as system database 24 and system data 25 stored therein, to serve requests received from user systems 12. Tenant data 23 can be divided into individual tenant storage spaces 112, which can be physically or logically arranged or divided. Within each tenant storage space 112, tenant data 114 and application metadata 116 can similarly be allocated for each user. For example, a copy of a user's most recently used (MRU) items can be stored in tenant data 114. Similarly, a copy of MRU items for an entire organization that is a tenant can be stored to tenant space 112.

Database system 16 of FIG. 1B also includes a user interface (UI) 30 and an application programming interface (API) 32. Process space 28 includes system process space 102, individual tenant process spaces 104 and a tenant management process space 110. Application platform 18 includes an application setup mechanism 38 that supports application developers' creation and management of applications. Such applications and others can be saved as metadata into tenant database 22 by save routines 36 for execution by subscribers as one or more tenant process spaces 104 managed by tenant management process space 110, for example. Invocations to such applications can be coded using procedural language for structured query language (PL/SQL) 34, which provides a programming language style interface extension to the API 32. A detailed description of some PL/SQL language implementations is discussed in commonly assigned U.S. Pat. No. 7,730,478, titled METHOD AND SYSTEM FOR ALLOWING ACCESS TO DEVELOPED APPLICATIONS VIA A MULTI-TENANT ON-DEMAND DATABASE SERVICE, issued on Jun. 1, 2010, and hereby incorporated by reference herein in its entirety and for all purposes. Invocations to applications can be detected by one or more system processes, which manage retrieving application metadata 116 for the subscriber making the invocation and executing the metadata as an application in a virtual machine.

Each application server 100 can be communicably coupled with tenant database 22 and system database 24, for example, having access to tenant data 23 and system data 25, respectively, via a different network connection. For example, one application server $100_1$ can be coupled via the network 14 (for example, the Internet), another application server $100_2$ can be coupled via a direct network link, and another application server $100_N$ can be coupled by yet a different network connection. Transfer Control Protocol and Internet Protocol (TCP/IP) are examples of typical protocols that can be used for communicating between application servers 100 and database system 16. However, it will be apparent to one skilled in the art that other transport protocols can be used to optimize database system 16 depending on the network interconnections used.

In some implementations, each application server 100 is configured to handle requests for any user associated with any organization that is a tenant of database system 16. Because it can be desirable to be able to add and remove application servers 100 from the server pool at any time and for various reasons, in some implementations there is no server affinity for a user or organization to a specific application server 100. In some such implementations, an interface system implementing a load balancing function (for example, an F5 Big-IP load balancer) is communicably coupled between application servers 100 and user systems 12 to distribute requests to application servers 100. In one implementation, the load balancer uses a least-connections algorithm to route user requests to application servers 100. Other examples of load balancing algorithms, such as round robin and observed-response-time, also can be used. For example, in some instances, three consecutive requests from the same user could hit three different application servers 100, and three requests from different users could hit the same application server 100. In this manner, by way of example, database system 16 can be a multi-tenant system in which database system 16 handles storage of, and access to, different objects, data, and applications across disparate users and organizations.

In some embodiments, server 100 includes an automated database replication and testing system as described herein.

In one example storage use case, one tenant can be a company that employs a sales force where each salesperson uses database system 16 to manage aspects of their sales. A user can maintain contact data, leads data, customer followup data, performance data, goals and progress data, etc., all applicable to that user's personal sales process (for example, in tenant database 22). In an example of a MTS arrangement, because all of the data and the applications to access, view, modify, report, transmit, calculate, etc., can be maintained and accessed by a user system 12 having little more than network access, the user can manage his or her sales efforts and cycles from any of many different user systems. For example, when a salesperson is visiting a customer and the customer has Internet access in their lobby, the salesperson can obtain critical updates regarding that customer while waiting for the customer to arrive in the lobby.

While each user's data can be stored separately from other users' data regardless of the employers of each user, some data can be organization-wide data shared or accessible by several users or all of the users for a given organization that is a tenant. Thus, there can be some data structures managed database system 16 that are allocated at the tenant level while other data structures can be managed at the user level. Because an MTS can support multiple tenants including possible competitors, the MTS can have security protocols that keep data, applications, and application use separate. Also, because many tenants may opt for access to an MTS rather than maintain their own system, redundancy, up-time, and backup are additional functions that can be implemented in the MTS. In addition to user-specific data and tenant-specific data, database system 16 also can maintain system level data usable by multiple tenants or other data. Such system level data can include industry reports, news, postings, and the like that are sharable among tenants.

In some implementations, user systems 12 (which also can be client systems) communicate with application servers 100 to request and update system-level and tenant-level data from database system 16. Such requests and updates can involve sending one or more queries to tenant database 22 or system database 24. Database system 16 (for example, an application server 100 in database system 16) can automatically generate one or more SQL statements (for example, one or more SQL queries) designed to access the desired information. System database 24 can generate query plans to access the requested data from the database. The term "query plan" generally refers to one or more operations used to access information in a database system.

Each database can generally be viewed as a collection of objects, such as a set of logical tables, containing data fitted into predefined or customizable categories. A "table" is one representation of a data object and may be used herein to simplify the conceptual description of objects and custom objects according to some implementations. It should be understood that "table" and "object" may be used interchangeably herein. Each table generally contains one or more data categories logically arranged as columns or fields in a viewable schema. Each row or element of a table can contain an instance of data for each category defined by the fields. For example, a CRM database can include a table that describes a customer with fields for basic contact information such as name, address, phone number, fax number, etc. Another table can describe a purchase order, including fields for information such as customer, product, sale price, date, etc. In some MTS implementations, standard entity tables can be provided for use by all tenants. For CRM database applications, such standard entities can include tables for case, account, contact, lead, and opportunity data objects, each containing pre-defined fields. As used herein, the term "entity" also may be used interchangeably with "object" and "table."

In some MTS implementations, tenants are allowed to create and store custom objects, or may be allowed to customize standard entities or objects, for example by creating custom fields for standard objects, including custom index fields. Commonly assigned U.S. Pat. No. 7,779,039, titled CUSTOM ENTITIES AND FIELDS IN A MULTI-TENANT DATABASE SYSTEM, issued on Aug. 17, 2010, and hereby incorporated by reference herein in its entirety and for all purposes, teaches systems and methods for creating custom objects as well as customizing standard objects in a multi-tenant database system. In some implementations, for example, all custom entity data rows are stored in a single multi-tenant physical table, which may contain multiple logical tables per organization. It is transparent to customers that their multiple "tables" are in fact stored in one large table or that their data may be stored in the same table as the data of other customers.

Figure 2A:
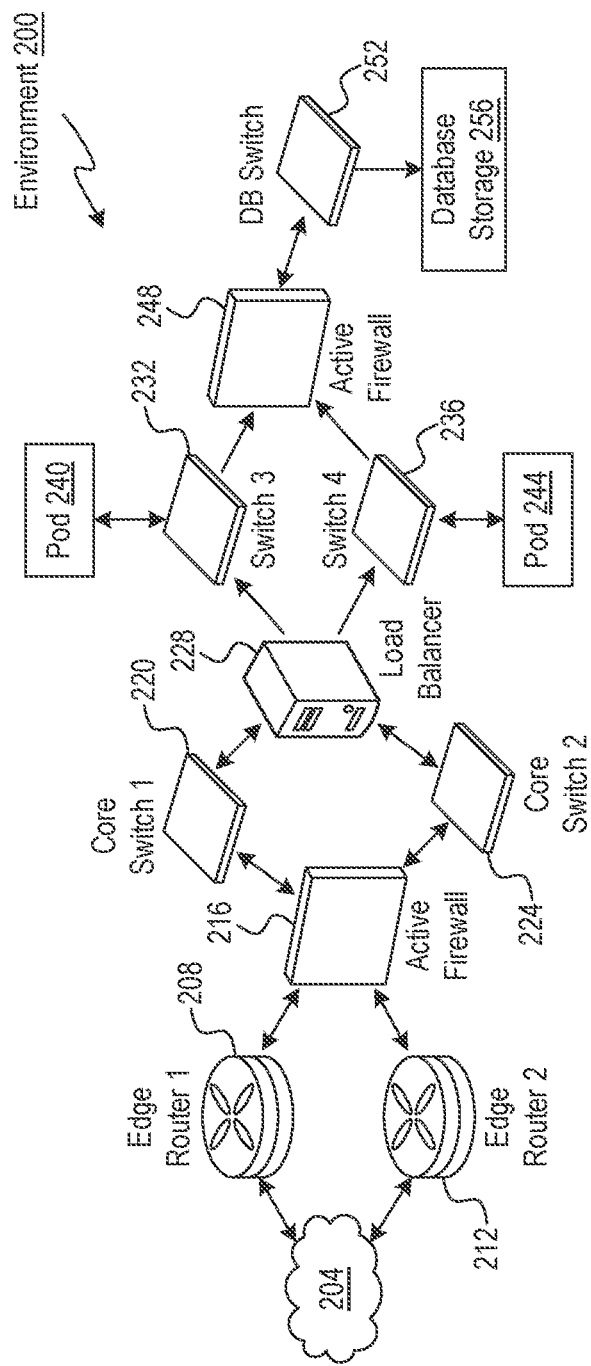
FIG. 2A illustrates example architectural components of an on-demand database service environment according to some embodiments.

FIG. 2A shows a system diagram illustrating example architectural components of an on-demand database service environment 200 according to some implementations. A client machine communicably connected with the cloud 204, generally referring to one or more networks in combination, as described herein, can communicate with the on-demand database service environment 200 via one or more edge routers 208 and 212. A client machine can be any of the examples of user systems 12 described above. The edge routers can communicate with one or more core switches 220 and 224 through a firewall 216. The core switches can communicate with a load balancer 228, which can distribute server load over different pods, such as the pods 240 and 244. Pods 240 and 244, which can each include one or more servers or other computing resources, can perform data processing and other operations used to provide on-demand services. Communication with the pods can be conducted via pod switches 232 and 236. Components of the on-demand database service environment can communicate with database storage 256 through a database firewall 248 and a database switch 252.

Figure 2B:
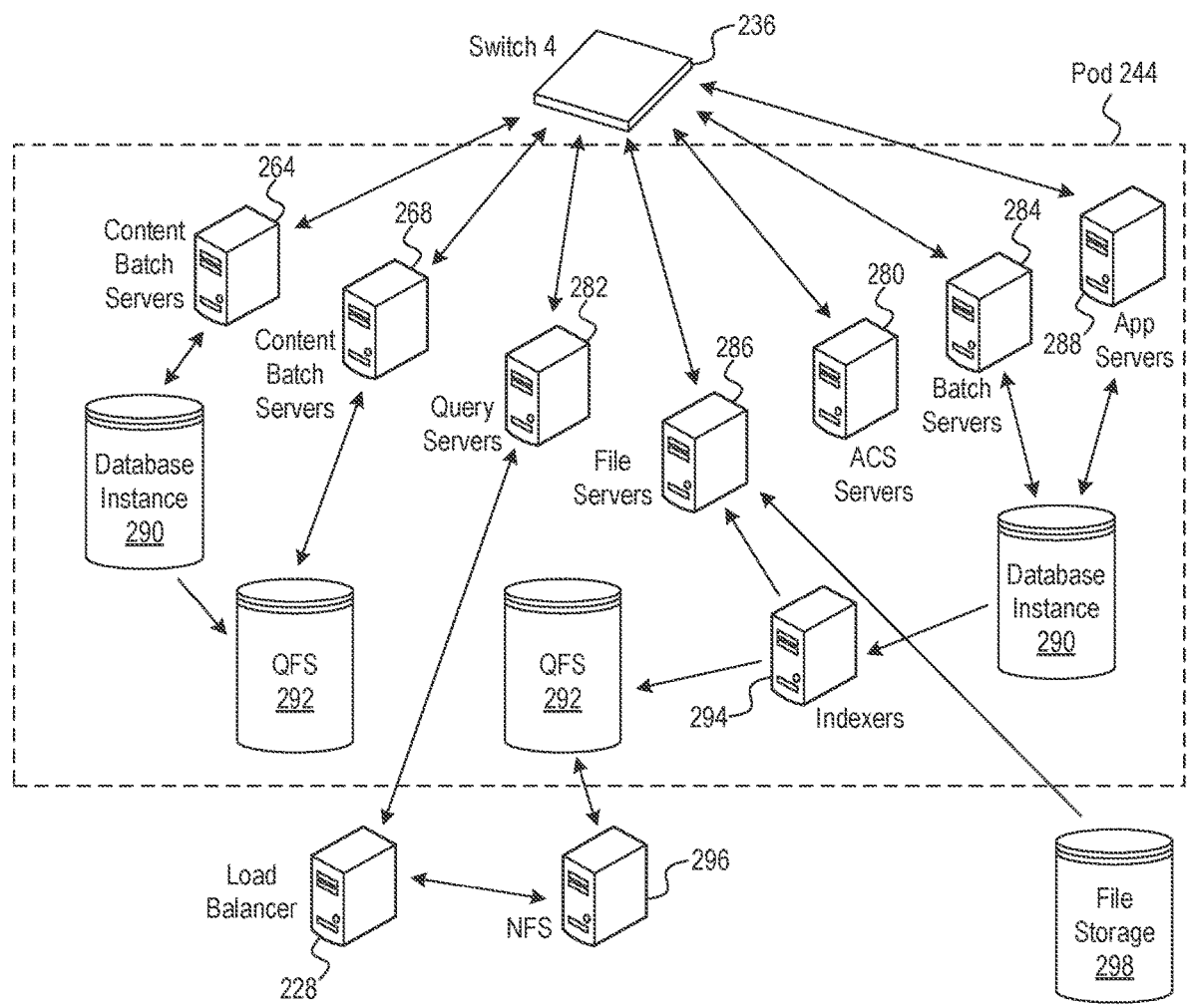
FIG. 2B illustrates example architectural components of an on-demand database service environment according to some embodiments.

As shown in FIGS. 2A and 2B, accessing an on-demand database service environment can involve communications transmitted among a variety of different hardware or software components. Further, the on-demand database service environment 200 is a simplified representation of an actual on-demand database service environment. For example, while only one or two devices of each type are shown in FIGS. 2A and 2B, some implementations of an on-demand database service environment can include anywhere from one to many devices of each type. Also, the on-demand database service environment need not include each device shown in FIGS. 2A and 2B or can include additional devices not shown in FIGS. 2A and 2B.

Additionally, it should be appreciated that one or more of the devices in the on-demand database service environment 200 can be implemented on the same physical device or on different hardware. Some devices can be implemented using hardware or a combination of hardware and software. Thus, terms such as "data processing apparatus," "machine," "server," "device," and "processing device" as used herein are not limited to a single hardware device; rather, references to these terms can include any suitable combination of hardware and software configured to provide the described functionality.

Cloud 204 is intended to refer to a data network or multiple data networks, often including the Internet. Client machines communicably connected with cloud 204 can communicate with other components of the on-demand database service environment 200 to access services provided by the on-demand database service environment. For example, client machines can access the on-demand database service environment to retrieve, store, edit, or process information. In some implementations, edge routers 208 and 212 route packets between cloud 204 and other components of the on-demand database service environment 200. For example, edge routers 208 and 212 can employ the Border Gateway Protocol (BGP). The BGP is the core routing protocol of the Internet. Edge routers 208 and 212 can maintain a table of Internet Protocol (IP) networks or 'prefixes,' which designate network reachability among autonomous systems on the Internet.

In some implementations, firewall 216 can protect the inner components of the on-demand database service environment 200 from Internet traffic. Firewall 216 can block, permit, or deny access to the inner components of on-demand database service environment 200 based upon a set of rules and other criteria. Firewall 216 can act as one or more of a packet filter, an application gateway, a stateful filter, a proxy server, or any other type of firewall.

In some implementations, core switches 220 and 224 are high-capacity switches that transfer packets within the on-demand database service environment 200. Core switches 220 and 224 can be configured as network bridges that quickly route data between different components within the on-demand database service environment. In some implementations, the use of two or more core switches 220 and 224 can provide redundancy or reduced latency.

In some implementations, pods 240 and 244 perform the core data processing and service functions provided by the on-demand database service environment. Each pod can include various types of hardware or software computing resources. An example of the pod architecture is discussed in greater detail with reference to FIG. 2B. In some implementations, communication between pods 240 and 244 is conducted via pod switches 232 and 236. Pod switches 232 and 236 can facilitate communication between pods 240 and 244 and client machines communicably connected with cloud 204, for example, via core switches 220 and 224. Also, pod switches 232 and 236 may facilitate communication between pods 240 and 244 and database storage 256. In some implementations, load balancer 228 can distribute workload between pods 240 and 244. Balancing the on-demand service requests between the pods can assist in improving the use of resources, increasing throughput, reducing response times, or reducing overhead. Load balancer 228 may include multilayer switches to analyze and forward traffic.

In some implementations, access to database storage 256 is guarded by a database firewall 248. Database firewall 248 can act as a computer application firewall operating at the database application layer of a protocol stack. Database firewall 248 can protect database storage 256 from application attacks such as SQL injection, database rootkits, and unauthorized information disclosure. In some implementations, database firewall 248 includes a host using one or more forms of reverse proxy services to proxy traffic before passing it to a gateway router. Database firewall 248 can inspect the contents of database traffic and block certain content or database requests. Database firewall 248 can work on the SQL application level atop the TCP/IP stack, managing applications' connection to the database or SQL management interfaces as well as intercepting and enforcing packets traveling to or from a database network or application interface.

In some implementations, communication with database storage 256 is conducted via database switch 252. Multi-tenant database storage 256 can include more than one hardware or software components for handling database queries. Accordingly, database switch 252 can direct database queries transmitted by other components of the on-demand database service environment (for example, pods 240 and 244) to the correct components within database storage 256. In some implementations, database storage 256 is an on-demand database system shared by many different organizations as described above with reference to FIGS. 1A and 1B.

FIG. 2B shows a system diagram further illustrating example architectural components of an on-demand database service environment according to some implementations. Pod 244 can be used to render services to a user of on-demand database service environment 200. In some implementations, each pod includes a variety of servers or other systems. Pod 244 includes one or more content batch servers 264, content search servers 268, query servers 282, file servers 286, access control system (ACS) servers 280, batch servers 284, and app servers 288. Pod 244 also can include database instances 290, quick file systems (QFS) 292, and indexers 294. In some implementations, some or all communication between the servers in pod 244 can be transmitted via pod switch 236.

In some implementations, app servers 288 include a hardware or software framework dedicated to the execution of procedures (for example, programs, routines, scripts) for supporting the construction of applications provided by on-demand database service environment 200 via pod 244. In some implementations, the hardware or software framework of an app server 288 is configured to execute operations of the services described herein, including performance of the blocks of various methods or processes described herein. In some alternative implementations, two or more app servers 288 can be included and cooperate to perform such methods, or one or more other servers described herein can be configured to perform the disclosed methods.

In an embodiment, one or more systems for automated database replication testing are executed by app servers 288.

Content batch servers 264 can handle requests internal to the pod. Some such requests can be long-running or not tied to a particular customer. For example, content batch servers 264 can handle requests related to log mining, cleanup work, and maintenance tasks. Content search servers 268 can provide query and indexer functions. For example, the functions provided by content search servers 268 can allow users to search through content stored in the on-demand database service environment. File servers 286 can manage requests for information stored in file storage 298. File storage 298 can store information such as documents, images, and binary large objects (BLOBs). In some embodiments, file storage 298 is a shared storage. By managing requests for information using file servers 286, the image footprint on the database can be reduced. Query servers 282 can be used to retrieve information from one or more file systems. For example, query servers 282 can receive requests for information from app servers 288 and transmit information queries to network file systems (NFS) 296 located outside the pod.

Pod 244 can share a database instance 290 configured as a multi-tenant environment in which different organizations share access to the same database. Additionally, services rendered by pod 244 may call upon various hardware or software resources. In some implementations, ACS servers 280 control access to data, hardware resources, or software resources. In some implementations, batch servers 284 process batch jobs, which are used to run tasks at specified times. For example, batch servers 284 can transmit instructions to other servers, such as app servers 288, to trigger the batch jobs.

In some implementations, QFS 292 is an open source file system available from Sun Microsystems, Inc. The QFS can serve as a rapid-access file system for storing and accessing information available within the pod 244. QFS 292 can support some volume management capabilities, allowing many disks to be grouped together into a file system. File system metadata can be kept on a separate set of disks, which can be useful for streaming applications where long disk seeks cannot be tolerated. Thus, the QFS system can communicate with one or more content search servers 268 or indexers 294 to identify, retrieve, move, or update data stored in NFS 296 or other storage systems.

In some implementations, one or more query servers 282 communicate with the NFS 296 to retrieve or update information stored outside of the pod 244. NFS 296 can allow servers located in pod 244 to access information to access files over a network in a manner similar to how local storage is accessed. In some implementations, queries from query servers 282 are transmitted to NFS 296 via load balancer 228, which can distribute resource requests over various resources available in the on-demand database service environment. NFS 296 also can communicate with QFS 292 to update the information stored on NFS 296 or to provide information to QFS 292 for use by servers located within pod 244.

In some implementations, the pod includes one or more database instances 290. Database instance 290 can transmit information to QFS 292. When information is transmitted to the QFS, it can be available for use by servers within pod 244 without using an additional database call. In some implementations, database information is transmitted to indexer 294. Indexer 294 can provide an index of information available in database instance 290 or QFS 292. The index information can be provided to file servers 286 or QFS 292. In some embodiments, there may be a plurality of database instances stored and accessed throughout the system.

Figure 3:
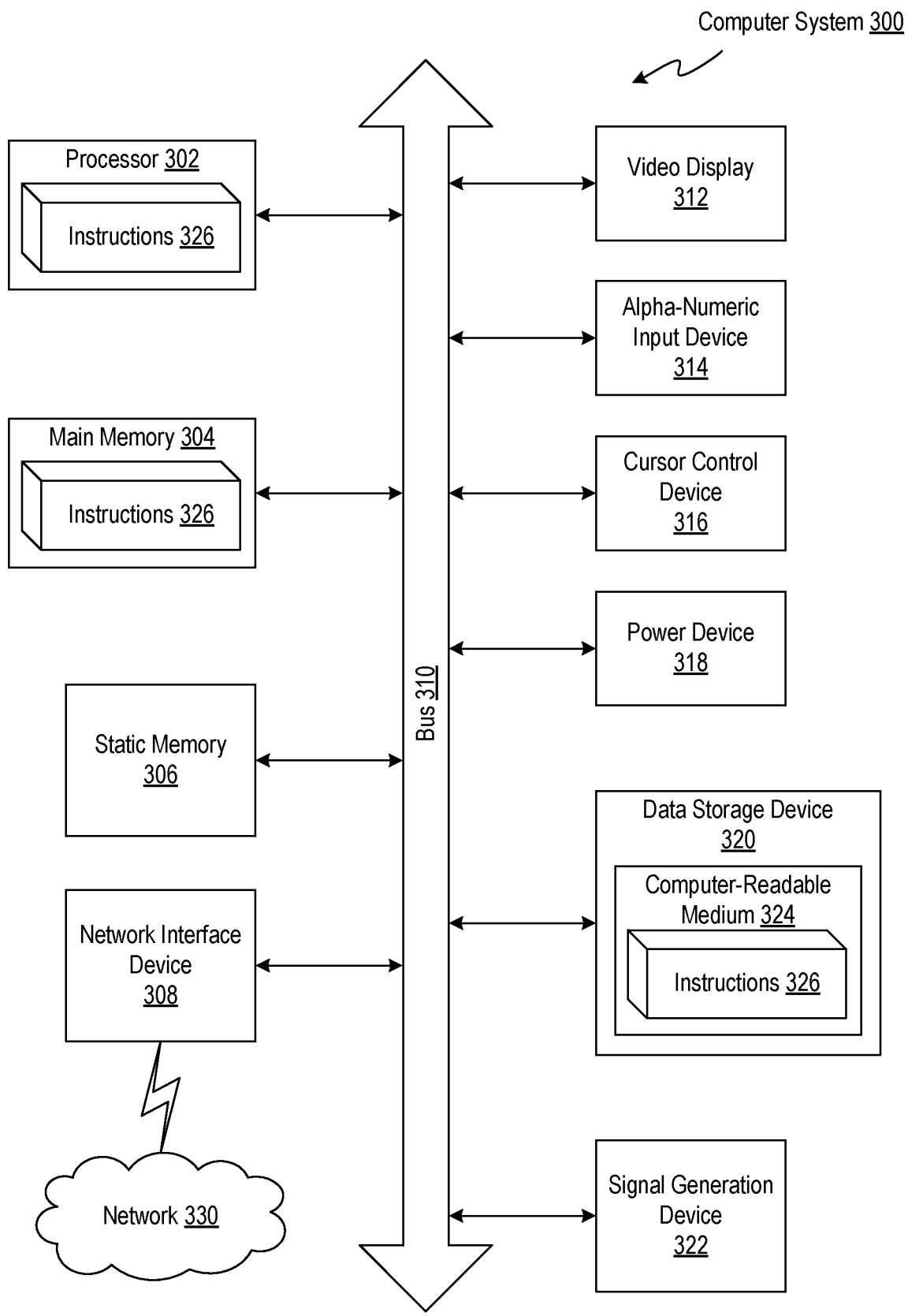
FIG. 3 is a diagrammatic representation of a machine in the exemplary form of a computer system within which one or more embodiments may be carried out.

FIG. 3 illustrates a diagrammatic representation of a machine in the exemplary form of a computer system 300 within which a set of instructions (e.g., for causing the machine to perform any one or more of the methodologies discussed herein) may be executed. In alternative implementations, the machine may be connected (e.g., networked) to other machines in a LAN, a WAN, an intranet, an extranet, or the Internet. The machine may operate in the capacity of a server or a client machine in client-server network environment, or as a peer machine in a peer-to-peer (or distributed) network environment. The machine may be a personal computer (PC), a tablet PC, a set-top box (STB), a PDA, a cellular telephone, a web appliance, a server, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein. Some or all of the components of the computer system 300 may be utilized by or illustrative of any of the electronic components described herein (e.g., any of the components illustrated in or described with respect to FIGS. 1A, 1B, 2A, and 2B).

The exemplary computer system 300 includes a processing device (processor) 302, a main memory 304 (e.g., ROM, flash memory, dynamic random access memory (DRAM) such as synchronous DRAM (SDRAM) or Rambus DRAM (RDRAM), etc.), a static memory 306 (e.g., flash memory, static random access memory (SRAM), etc.), and a data storage device 320, which communicate with each other via a bus 310.

Processor 302 represents one or more general-purpose processing devices such as a microprocessor, central processing unit, or the like. More particularly, processor 302 may be a complex instruction set computing (CISC) microprocessor, reduced instruction set computing (RISC) microprocessor, very long instruction word (VLIW) microprocessor, or a processor implementing other instruction sets or processors implementing a combination of instruction sets. Processor 302 may also be one or more special-purpose processing devices such as an application specific integrated circuit (ASIC), a field programmable gate array (FPGA), a digital signal processor (DSP), network processor, or the like. Processor 302 is configured to execute instructions 326 for performing the operations and steps discussed herein. Processor 302 may have one or more processing cores.

Computer system 300 may further include a network interface device 308. Computer system 300 also may include a video display unit 312 (e.g., a liquid crystal display (LCD), a cathode ray tube (CRT), or a touch screen), an alphanumeric input device 314 (e.g., a keyboard), a cursor control device 316 (e.g., a mouse or touch screen), and a signal generation device 322 (e.g., a loud speaker).

Power device 318 may monitor a power level of a battery used to power computer system 300 or one or more of its components. Power device 318 may provide one or more interfaces to provide an indication of a power level, a time window remaining prior to shutdown of computer system 300 or one or more of its components, a power consumption rate, an indicator of whether computer system is utilizing an external power source or battery power, and other power related information. In some implementations, indications related to power device 318 may be accessible remotely (e.g., accessible to a remote back-up management module via a network connection). In some implementations, a battery utilized by power device 318 may be an uninterruptable power supply (UPS) local to or remote from computer system 300. In such implementations, power device 318 may provide information about a power level of the UPS.

Data storage device 320 may include a computer-readable storage medium 324 (e.g., a non-transitory computer-readable storage medium) on which is stored one or more sets of instructions 326 (e.g., software) embodying any one or more of the methodologies or functions described herein. Instructions 326 may also reside, completely or at least partially, within main memory 304 and/or within processor 302 during execution thereof by computer system 300, main memory 304, and processor 302 also constituting computer-readable storage media. Instructions 326 may further be transmitted or received over a network 330 (e.g., network 14) via network interface device 308.

In one implementation, instructions 326 include instructions for performing any of the implementations of a system for automated database replication and testing described herein. While computer-readable storage medium 324 is shown in an exemplary implementation to be a single medium, it is to be understood that computer-readable storage medium 324 may include a single medium or multiple media (e.g., a centralized or distributed database, and/or associated caches and servers) that store the one or more sets of instructions.

Figure 4:
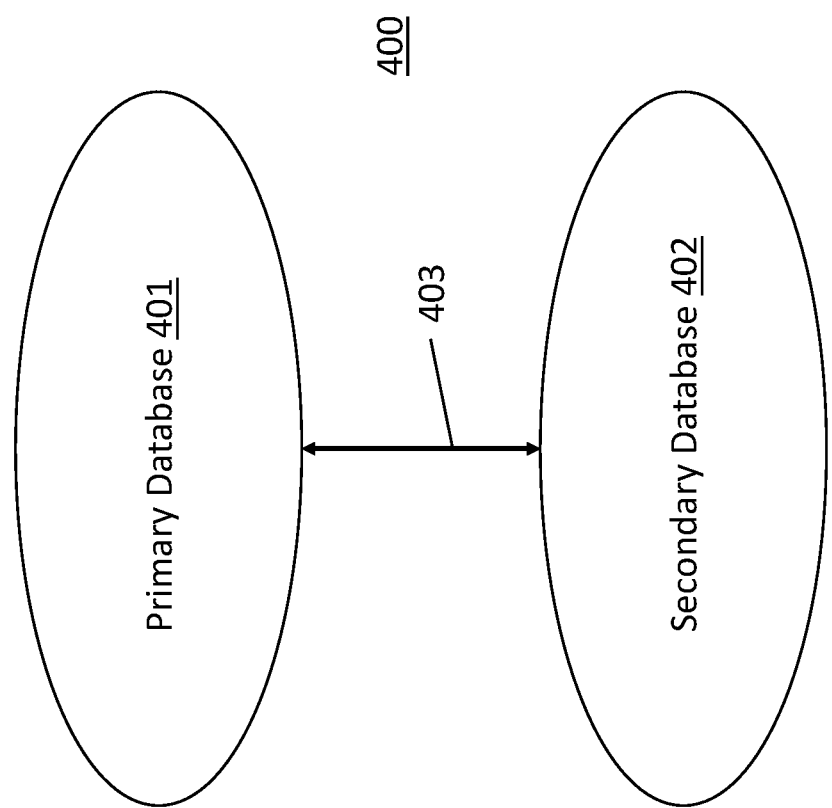
FIG. 4 illustrates a database composed of a primary database and a secondary database.

FIG. 4 shows a more detailed view of a database implementation 400. Database 400 can be, for example, any of the tenant and system databases 22, 24 discussed above with respect to FIGS. 1A and 1B, and/or, database storage 256 and database instance(s) 290 discussed above with respect to FIGS. 2A and 2B.

As observed in FIG. 4, a database typically includes a primary database 401 and a secondary database 402 that are communicatively coupled to one another through one or more networks 403. The primary database 401 acts as the "up-front" or "front-end" active database for the various users that use the database 400. As such, as the users invoke the database 400 for immediate read and/or write accesses, the read and/or write accesses are exercised from/to the primary database 401.

By contrast, the secondary database 402 acts as a "backup" database that provides some degree of reliability for the data that is stored in the primary database 401. That is, the secondary database 402 strives to keep at least a second copy of the data kept by the primary database 401 so that, e.g., in case of a failure of any of the primary database's hardware and/or software components resulting in loss of data in the primary database 401, the lost data can be recovered by reading a second copy of it from the secondary database 402.

As alluded to in the background, synchronizing the secondary database 402 with the primary database 401 becomes a challenge as the storage capacity of the primary database 401 expands to that of a large scale database (e.g., having billions of records, tens of billions of records, or more). Here, considering the volume of information that is to be transferred from the primary database 401 to the secondary database 402 in order to maintain the secondary database 402 with the most recent content of the records in the primary database 401, as the primary database 401 increases its storage capacity, it becomes increasingly difficult to keep the state of the secondary database 402 up to date with the current state of the primary database 401.

For example, over a finite runtime as the users use the primary database 401, some number of records (e.g., objects, files, etc.) kept by the primary database 401 are apt to be deleted. The synchronization process, ideally, informs the secondary database 402 of the deletions so that, among other considerations, the size of the secondary database 402 does not grow beyond the size of the primary database 401 (because it would otherwise maintain records that have been deleted from the primary database 401). As the secondary database 402 is informed of deletions made in the primary database 401, the secondary database 402 can likewise delete these same records from itself which, in turn, keeps the size of the secondary database 402 in check.

One approach to synchronizing the secondary database 402 with the deletes made to the primary database 401 is to track deletes on a list or queue that is maintained by the primary database 401 (e.g., in any of process space 28, 102, 110 associated with the particular database 400). Periodically, or if the list/queue of such deletes becomes full or near full, the list of deleted records is sent from the primary database 401 to the secondary database 402. In the case of an extremely large primary database, the number of deletes that can be made within a limited amount of time can be quite large, resulting in a large list of deletes that need to be sent from the primary database 401 to the secondary database 402.

A problem with batching large numbers of such deletes at the primary database 401, however, is the occurrence of a hardware and/or software crash in the primary database 401 that causes the (potentially extensive) list of deletes to be lost before it is transferred to the secondary database 402. In this event, the secondary database 402 would be "stuck" with large numbers of stale records. That is, the secondary database 402 would never receive the identity of the particular records on the (lost) list as eligible for deletion and would therefore permanently keep them.

Another approach to synchronizing the secondary database 402 with the deletes of the primary database 401 is to scroll through the records in the primary system (and/or meta-data for the records) and mark those records (and/or their meta data) that are needed (i.e., should not be deleted). After the scrolling is complete, a message is sent to the secondary database 401 that identifies all the records that were not marked as needed. A problem with this approach, however, is that as the storage capacity of the primary database 401 expands to, e.g., an extremely large database, it becomes difficult to fully scroll through the records of the primary system 401 with sufficient periodicity/frequency to keep the state of the records within the secondary database 402 sufficiently up to speed with their corresponding records in the primary database 401.

That is, considerable amounts of time would be consumed scrolling through the primary database 401 between delete update messages sent to the secondary database 402. This allows, potentially, for the respective states of the primary and secondary databases 401, 402 to considerably diverge between updates, and, should a crash of hardware/software components of the primary database 401 occur when such divergence exists, the secondary database 402 would again be stuck with stale records. That is, assuming the marking information to keep certain records is lost from the primary database 401, there would be no way to distinguish whether the affected records were marked to be kept or not. As such, the secondary database 402 will not delete any of its records even though at least some of them were presumably not marked to be kept.

Figure 5:
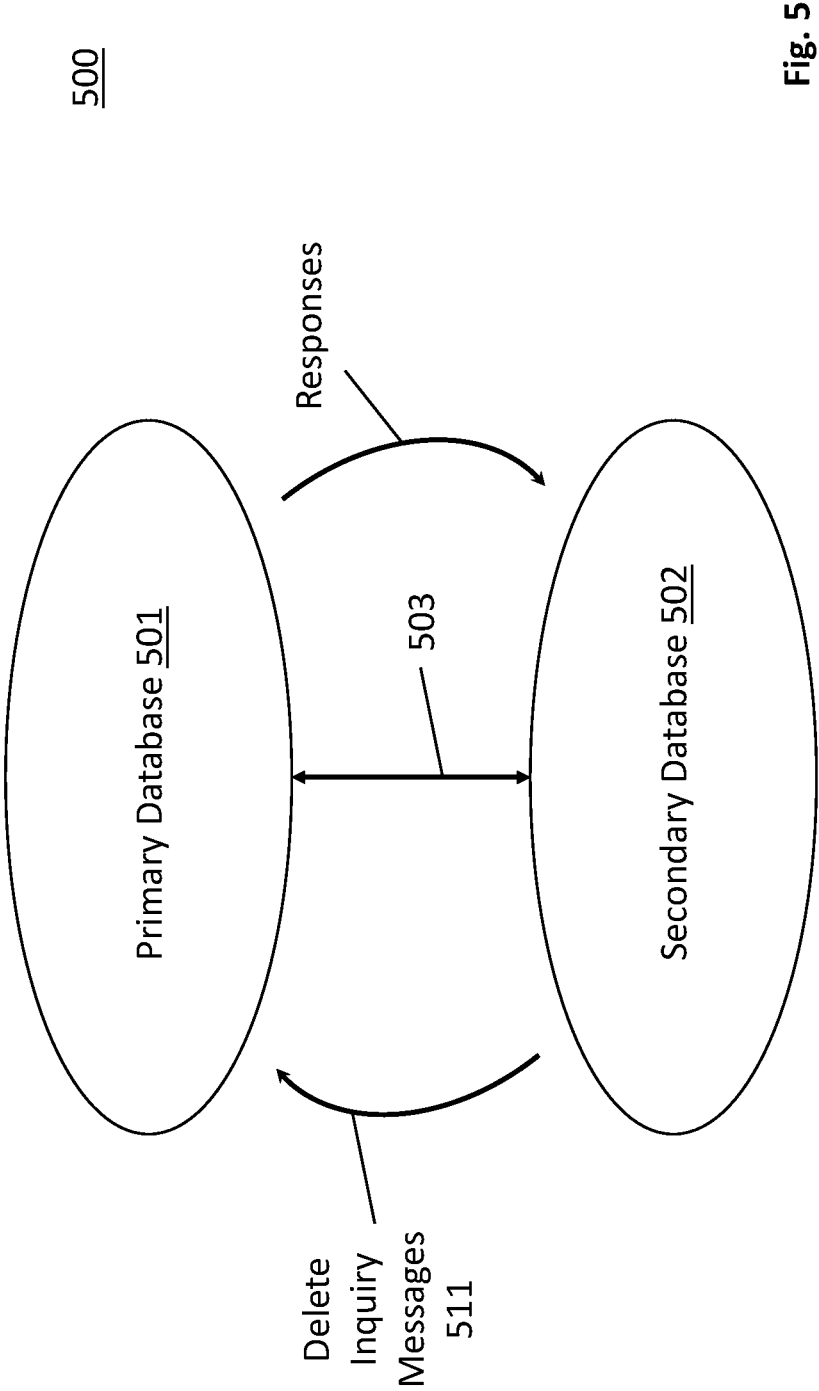
FIG. 5 illustrates delete operations between a primary and secondary database being synchronized.
Figure 6:
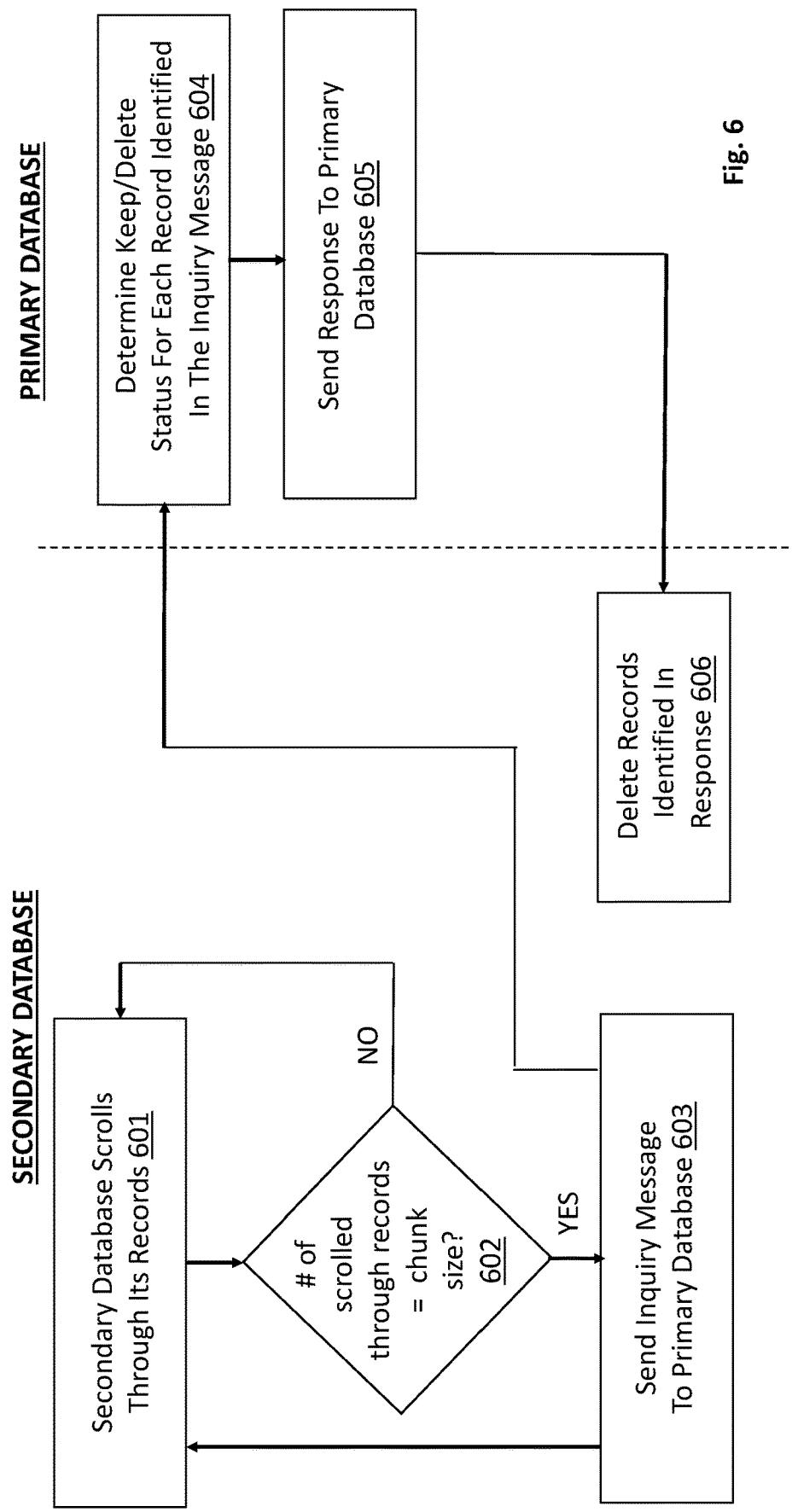
FIG. 6 illustrates a method for synchronizing delete operations between primary and secondary databases

FIGS. 5 and 6 pertain to an improved approach over the previously described pair of approaches whereby the secondary database 502 actively sends inquiry messages 511, 603 to the primary database 501 about the keep/deletion status of certain records within the secondary database 502. That is, whereas the secondary database 502 was passive in the aforementioned approaches (it waited to be informed by the primary database of deletions to specific records), by contrast, in the improved approach of FIGS. 5 and 6, the secondary database 502 is pro-active. That is, the secondary database 502 scrolls its own records and sends inquiry messages 511, 603 to the primary database 501 as to whether certain ones of these records should be deleted or not.

As observed in the flow diagram of FIG. 6, the secondary database 502 scrolls through its records 601 (or, e.g., scrolls through a representation of its records such as an organizational tree, meta-data that lists its records, etc.) and, upon some number (a "chunk") of records being encompassed 602, sends an inquiry 603 to the primary database 501 that lists each record in the chunk and asks if any of the listed records in the chunk can be deleted. In response to its reception of the message, the primary database 501 checks 604 whether any of the records listed on the inquiry message do not exist, are marked for deletion, or otherwise performs a delete/keep disposition for each of the listed records. The primary database 501 then sends 605 a response to the secondary database 502 that identifies which records from the list, if any, can be deleted. The secondary database 502 subsequently deletes 606 any of the records identified in the response.

For the next iteration cycle, the secondary database 502 scrolls 601 through a next portion of its total records, and, upon a next chunk of different records being reached 602, sends another inquiry message 603 to the primary database 501 that lists each next record and asks if any of the listed records in the chunk can be deleted. The process then continually repeats as described above.

Depending on implementation, the inquiry message for a next chunk of records can be prepared and/or sent to the primary database 501 immediately after the response to the preceding inquiry message has been received or followed through on (meaning records identified for deletion are deleted from the secondary database 502). Here, by steadily updating itself with the delete/keep status of its own records across a "sliding window" of these records (the respective records associated with each inquiry/response cycle over a series of such cycles), the secondary database 502 is able to keep its state in pace with the state of the primary database 501 with modest/acceptable diversion. The sliding window can be enlarged, e.g., by permitting some number of message/response cycles to be simultaneously in-flight. For example, the synchronization process can permit a maximum of 3, 4, 5, etc. inquiry messages to be in-flight at any time. When the maximum number of inquiry messages are in-flight, a next inquiry message for a next chunk of records can not be sent until a next response is received for one of the in-flight messages.

Additionally, the burden placed on the primary database 501 by the delete updating process can easily be determined/established from the size of the chunks and/or the frequency at which the inquiry messages are sent to the primary database 501.

That is, for instance, each record listed in an inquiry message can be correlated to some amount of processing resources ("ops") expended by the primary database 501 to make a keep/delete disposition on (such ops, e.g., can be executed from any of process space 28, 102, 110 discussed above with respect to FIGS. 1A and 1B). For example, the amount of CPU resource consumed by the primary database to refer to a page in memory that contains "keep/delete" meta data for a particular one of the primary database's records can correspond to a single op. The total burden (total "ops") placed on the primary database 501 per inquiry message then corresponds to the number of records listed in a message inquiry multiplied by the number of ops per record. The total burden placed on the primary database 501 by the deletion update process as a whole corresponds to the number of ops per inquiry message and the rate at which message inquiries are sent to the primary database 501.

Here, some portion of total primary database 501 processing resources can be allocated or planned on for responding to deletion inquiry messages. The chunk size and rate at which message inquiries are sent to the primary database 501 are then configured to keep the processing resources that the primary database 501 expends responding to the inquiry messages within the budget. Importantly, the budget can be adjusted in real time based on current usage of the primary database 501.

For instance, if user read/write activity directed to the primary database 501 is elevated during nominal working hours but dissipates during non working hours and/or weekends, then, the primary database's ops budget for deletion updates can be lowered during working hours but raised during non-working hours and/or weekends. Correspondingly, chunk size and/or inquiry message rate can be lowered during working hours but raised during non working hours and/or weekends. So doing may cause the delete record states between the two databases 501, 502 to diverge during working hours. However, the delete record states between the two databases 501, 502 should rapidly converge during non working hours.

Similar budgetary considerations can be undertaken with respect to the network(s) 503 that reside between the primary and secondary databases 501, 502 as each inquiry message and response cycle consumes some amount of bandwidth of these network(s) 503. Generally, the load offered to the network(s) 503 by each inquiry message grows with chunk size and inquiry message submission rate. Generally, however, even in the case of large chunks and/or high message emission rates, the bandwidth consumption is expected to be modest as compared to the total bandwidth capacity of the network(s) (assuming the network(s) 503 are high performance network(s) having large bandwidth).

That is, if the total bandwidth capacity of the network(s) is tens of gigabytes per second (GB/s) or more and the inquiries are megabytes (MB), tens of megabytes or even hundreds of megabytes, periodic/occasional emission of inquiry messages would not be expected to overload the network(s) 503. Additionally, responses to inquiry messages can be compressed to only identify those files needing deletion (files that are to be kept are not included in the response), or only identify the lesser of files needing deletion and files to be kept with the response identifying which format is being used. Nevertheless, during, periods of time where higher priority traffic is approaching the bandwidth capacity of the network(s) 503, inquiry messages can be separated further in time and/or temporarily ceased to ensure the higher priority traffic is not delayed by the record deletion synchronization process.

Figure 7:
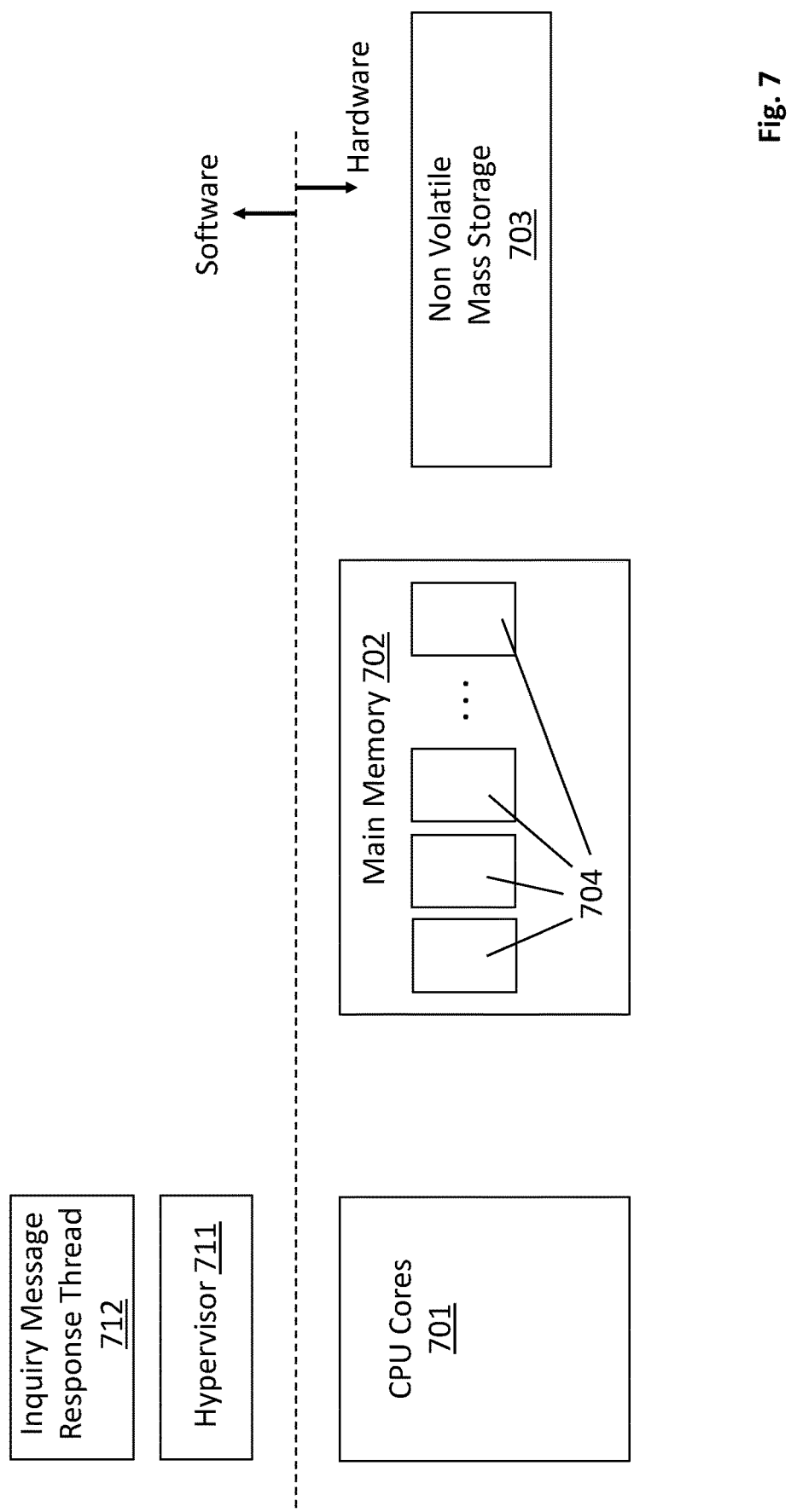
FIG. 7 shows a computer having pages of meta-data in system memory that indicate keep/delete status of records in a database.

FIG. 7 shows a depiction of a physical instance of the process space implemented at the primary database to determine the keep/delete status of the records identified on an inquiry message received from the secondary database 502. As observed in FIG. 7, the physical instance of process space includes one or more central processing unit cores (CPU cores) 701 coupled to a system (or "main") memory 702. The system memory 502 typically includes faster dynamic random access memory (DRAM)) as opposed to the slower, architecturally more distant mass storage devices (such as hard disk drives (HDDs) or solid state drives (SSDs) composed of flash memory) that the deeper non volatile mass storage 703 is composed of. The physical instance of process space also includes hypervisor (e.g., virtual machine monitor) software 711 upon which a software thread 712 is allocated to execute, e.g., internal management operations of the primary database such as processing received inquiry messages received from the secondary database and generating responses to the same.

In various embodiments, the instance of process space keeps meta data, e.g., for each record in the primary database, that identifies whether the record is deemed deleted or delete-able. By keeping such meta data in system memory 702, the primary database system can more quickly respond to an inquiry message received from the secondary database system (as compared to an arrangement where the meta data is only keep in deeper non volatile mass storage 703). More specifically, recalling that each record identified in an inquiry can consume one or more primary database ops, such ops could consist of the CPU cores 701 referring to a particular record's meta data in system memory 702. With such main memory 702 being faster than mass storage 703 from the perspective of the CPU cores 701, the amount of time consumed per op should be very small. As such, the primary database system can quickly respond to an inquiry message even if the inquiry message lists large numbers of records that a delete/keep determination needs to be performed for.

Nevertheless, because of the sheer size of the primary database system's capacity (e.g., tens of billions or records or more), the meta data for all the records stored in the primary database system can not fit into the system memory 702 space reserved for such meta data. For example, according to one approach, the "keep/delete" meta-data for a number of stored records are stored on a single "page" in system memory, and, only a limited number of such pages 704 can fit in the system memory space allocated for the keeping of such page. As such, at any instant of time, all such pages for all records in the primary database are kept in deeper non-volatile mass storage 703, and, a subset of these pages 704 (e.g., the most frequently accessed ones reflecting the pages whose records which have their meta-data most frequently updated) are kept in system memory 702.

Depending on page usage, e.g., pages 704 that are in system memory but have not been frequently and/or recently used are swapped out of system memory 702 and written into non volatile mass storage 703 in favor of pages that are not in system memory but have been frequently and/or recently accessed from non volatile mass storage 703. That is, a lesser used page in system memory 702 is swapped out of system memory 702 and stored in mass storage 703 to make room in system memory 702 for a page that is only in non volatile mass storage 703 and has recently demonstrated greater usage (e.g., the more frequently used page in mass storage replaces the lesser used page in system memory 702).

As such, at any given instant of time, it is not known whether the page having a particular record's meta data is in system memory or not. In various embodiments, a bloom filter is used to determine whether or not a record's meta data page (and/or the meta data for a particular record) is within system memory. The bloom filter may be implemented with any combination of hardware and software and can have its internal data structures (e.g., hash-tables) maintained in system memory 702. As is known in the art, however, a bloom filter can return a false negative. That is, if a record's page/meta-data is within system memory, the bloom filer will return a positive response to an inquiry as to whether or not the record's page/meta-data exists in system memory 702. By contrast, if the bloom filter returns a negative response to an inquiry as to whether or not a record's page/meta-data exists in system memory 702, the record's page/meta-data could, or could not, exist in system memory (the bloom filter returns an indeterminate result).

In various embodiments, the process for deciding whether or not to deem a record as deleted or delete-able for purposes of responding to an inquiry message is taken from the bloom filter including regarding any record for which the bloom filter returns a negative response as being not deleted and not delete-able. For records that the bloom filer returns a positive response, the process looks into the page/meta-data in system memory 702 to see if the record is deleted/delete-able or not deleted/delete-able. Thus, the primary database response is truly accurate for any records listed in an inquiry message whose meta data actually exists in system memory 702 and is conservative for any records listed in an inquiry message (meaning the record is deemed to not be deleted or delete-able) whose meta data may or may not be in system memory 702.

By so doing, meta-data page look-ups to respond to an inquiry message are confined to system memory 702 and do not extend into deeper non volatile mass storage 703. That is, recalling from the discussion above in which all meta-data pages are kept in non volatile mass storage 703 but only a subset of such pages have copies that are also kept in system memory 702, the response process to an inquiry message from the secondary database entails looking up pages that only exist in system memory 702.

In an alternate embodiment, in response to a negative return from the bloom filter in response to an inquiry as to whether or not the page/meta-data for a particular record exists in system memory 702, the process could perform a deeper look-up into system memory to see if the page having the sought for meta data actually exists in system memory 702, and, if it does, analyze the meta data to see if the record is deleted/delete-able. If the page does not actually exist in system memory 702 after the deeper look-up into system memory is performed, the record whose meta data is on the sought for page is deemed not deleted and not delete-able by the response thread 712 (i.e., an even deeper look into non volatile mass storage 703 to determine the true keep/delete status of the record is not performed).

Here, by avoiding deeper looks into system memory 702 and/or at least avoiding fetches from non volatile mass storage 703, the amount of ops and/or time consumed by the primary database CPU resources 701 to an inquiry message received from the secondary database system should be minimal.

Figure 8:
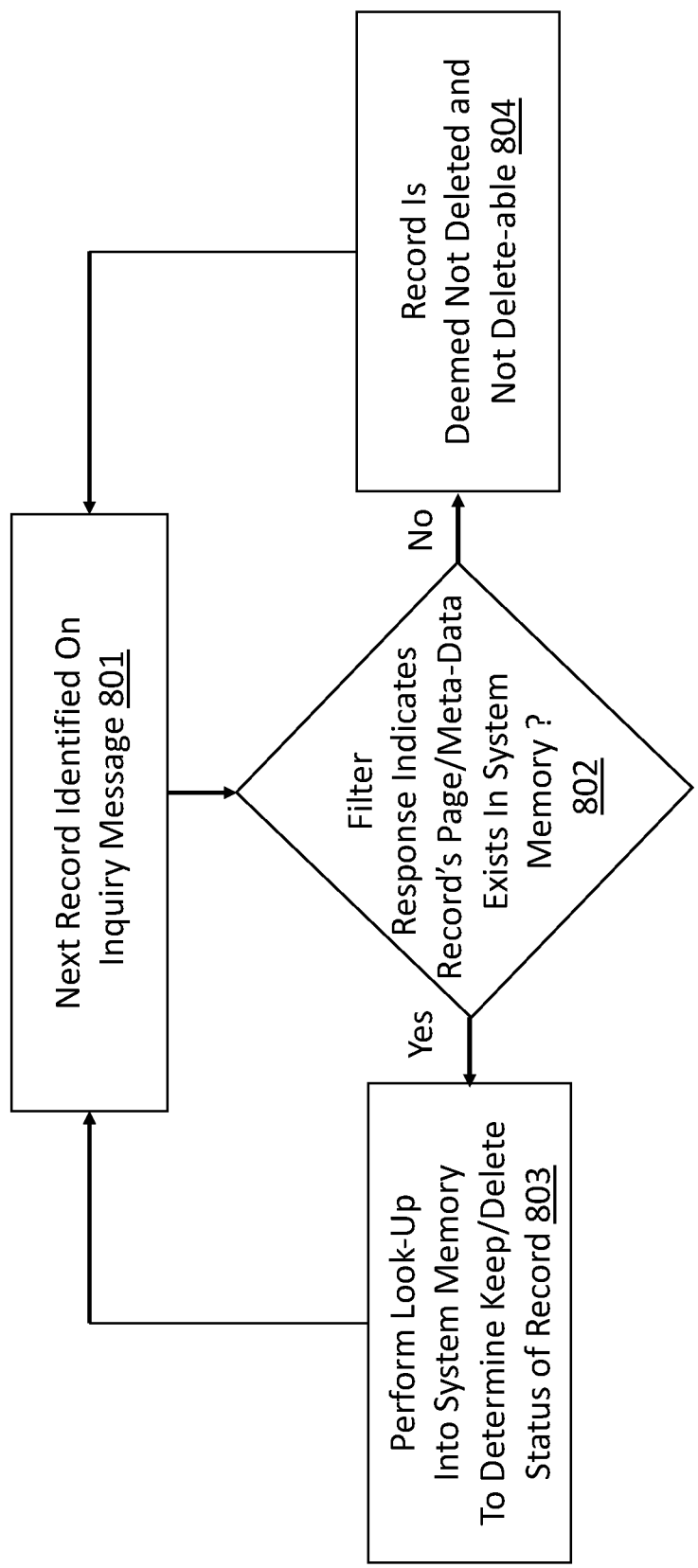
FIG. 8 shows a method for determining whether a record is to be regarded as delete-able for purposes of responding to an inquiry message from a secondary database.

FIG. 8 shows a process for determining the keep/delete status of a record identified on an inquiry message. A next record identified in the message is identified 801 and the identity of the record is passed to a filer (such as a bloom filter) which returns an indication as to whether meta data for the record (such as page having meta data for multiple records including the particular record that is presently being processed) exists in system memory 802. If the filter returns a positive response, the meta data is fetched from system memory and analyzed to see whether the record is deleted or delete-able 803. If the filter returns a negative response, the record is deemed to be deleted or delete-able 804.

In various embodiments, the meta-data for a record that has been deleted from the primary database is not deleted from the primary database until the secondary database has confirmed that it understands the record is delete-able. Here, a next inquiry message can include a safe receipt confirmation of a response to an earlier inquiry message as a mechanism for the secondary database informing the primary database it understands certain records are to be deleted. Once this understanding has been confirmed the keep/delete meta-data for a deleted record in the primary database can be deleted from the primary database. Such back confirmation from the secondary database to the primary database can even identify records outright to guarantee correct synchronization between databases.

Although the above discussion has been directed to databases specifically, it is believed the teachings above can be applied to storage systems, generally. For example, file systems (storage systems that reach a record or file through a file path) and object storage systems (storage systems that reach a record or data object with an identifier ("object ID") that is unique to that object and, e.g., is used akin to a network destination address) are also believed to be capable of taking advantage of the teachings provided above.

Examples of systems, apparatuses, computer-readable storage media, and methods according to the disclosed implementations are described in this section. These examples are being provided solely to add context and aid in the understanding of the disclosed implementations. It will thus be apparent to one skilled in the art that the disclosed implementations may be practiced without some or all the specific details provided. In other instances, certain process or method operations, also referred to herein as "blocks," have not been described in detail in order to avoid unnecessarily obscuring the disclosed implementations. Other implementations and applications also are possible, and as such, the following examples should not be taken as definitive or limiting either in scope or setting.

In the detailed description, references are made to the accompanying drawings, which form a part of the description and in which are shown, by way of illustration, specific implementations. Although these disclosed implementations are described in sufficient detail to enable one skilled in the art to practice the implementations, it is to be understood that these examples are not limiting, such that other implementations may be used and changes may be made to the disclosed implementations without departing from their spirit and scope. For example, the blocks of the methods shown and described herein are not necessarily performed in the order indicated in some other implementations. Additionally, in some other implementations, the disclosed methods may include more or fewer blocks than are described. As another example, some blocks described herein as separate blocks may be combined in some other implementations. Conversely, what may be described herein as a single block may be implemented in multiple blocks in some other implementations. Additionally, the conjunction "or" is intended herein in the inclusive sense where appropriate unless otherwise indicated; that is, the phrase "A, B, or C" is intended to include the possibilities of "A," "B," "C," "A and B," "B and C," "A and C," and "A, B, and C."

The words "example" or "exemplary" are used herein to mean serving as an example, instance, or illustration. Any aspect or design described herein as "example" or "exemplary" is not necessarily to be construed as preferred or advantageous over other aspects or designs. Rather, use of the words "example" or "exemplary" is intended to present concepts in a concrete fashion.

In addition, the articles "a" and "an" as used herein and in the appended claims should generally be construed to mean "one or more" unless specified otherwise or clear from context to be directed to a singular form. Reference throughout this specification to "an implementation," "one implementation," "some implementations," or "certain implementations" indicates that a particular feature, structure, or characteristic described in connection with the implementation is included in at least one implementation. Thus, the appearances of the phrase "an implementation," "one implementation," "some implementations," or "certain implementations" in various locations throughout this specification are not necessarily all referring to the same implementation.

Some portions of the detailed description may be presented in terms of algorithms and symbolic representations of operations on data bits within a computer memory. These algorithmic descriptions and representations are the manner used by those skilled in the data processing arts to most effectively convey the substance of their work to others skilled in the art. An algorithm is herein, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, or otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "receiving," "retrieving," "transmitting," "computing," "generating," "adding," "subtracting," "multiplying," "dividing," "optimizing," "calibrating," "detecting," "performing," "analyzing," "determining," "enabling," "identifying," "modifying," "transforming," "applying," "aggregating," "extracting," "registering," "querying," "populating," "hydrating," "updating," or the like, refer to the actions and processes of a computer system, or similar electronic computing device, that manipulates and transforms data represented as physical (e.g., electronic) quantities within the computer system's registers and memories into other data similarly represented as physical quantities within the computer system memories or registers or other such information storage, transmission, or display devices.

The specific details of the specific aspects of implementations disclosed herein may be combined in any suitable manner without departing from the spirit and scope of the disclosed implementations. However, other implementations may be directed to specific implementations relating to each individual aspect, or specific combinations of these individual aspects. Additionally, while the disclosed examples are often described herein with reference to an implementation in which a computing environment is implemented in a system having an application server providing a front end for an on-demand database service capable of supporting multiple tenants, the present implementations are not limited to multi-tenant databases or deployment on application servers. Implementations may be practiced using other database architectures, i.e., ORACLE®, DB2® by IBM, and the like without departing from the scope of the implementations claimed. Moreover, the implementations are applicable to other systems and environments including, but not limited to, client-server models, mobile technology and devices, wearable devices, and on-demand services.

It should also be understood that some of the disclosed implementations can be embodied in the form of various types of hardware, software, firmware, or combinations thereof, including in the form of control logic, and using such hardware or software in a modular or integrated manner. Other ways or methods are possible using hardware and a combination of hardware and software. Any of the software components or functions described in this application can be implemented as software code to be executed by one or more processors using any suitable computer language such as, for example, C, C++, Java™, or Python using, for example, existing or object-oriented techniques. The software code can be stored as non-transitory instructions on any type of tangible computer-readable storage medium (referred to herein as a "non-transitory computer-readable storage medium"). Examples of suitable media include random access memory (RAM), read-only memory (ROM), magnetic media such as a hard-drive or a floppy disk, or an optical medium such as a compact disc (CD) or digital versatile disc (DVD), flash memory, and the like, or any combination of such storage or transmission devices. Computer-readable media encoded with the software/program code may be packaged with a compatible device or provided separately from other devices (for example, via Internet download). Any such computer-readable medium may reside on or within a single computing device or an entire computer system and may be among other computer-readable media within a system or network. A computer system, or other computing device, may include a monitor, printer, or other suitable display for providing any of the results mentioned herein to a user.

The disclosure also relates to apparatuses, devices, and system adapted/configured to perform the operations herein. The apparatuses, devices, and systems may be specially constructed for their required purposes, may be selectively activated or reconfigured by a computer program, or some combination thereof.

In the foregoing description, numerous details are set forth. It will be apparent, however, to one of ordinary skill in the art having the benefit of this disclosure, that the present disclosure may be practiced without these specific details. While specific implementations have been described herein, it should be understood that they have been presented by way of example only, and not limitation. The breadth and scope of the present application should not be limited by any of the implementations described herein but should be defined only in accordance with the following and later-submitted claims and their equivalents. Indeed, other various implementations of and modifications to the present disclosure, in addition to those described herein, will be apparent to those of ordinary skill in the art from the foregoing description and accompanying drawings. Thus, such other implementations and modifications are intended to fall within the scope of the present disclosure.

Furthermore, although the present disclosure has been described herein in the context of a particular implementation in a particular environment for a particular purpose, those of ordinary skill in the art will recognize that its usefulness is not limited thereto and that the present disclosure may be beneficially implemented in any number of environments for any number of purposes. Accordingly, the claims set forth below should be construed in view of the full breadth and spirit of the present disclosure as described herein, along with the full scope of equivalents to which such claims are entitled.

What is claimed is:

1. An apparatus, comprising:
   a processing device; and
   a memory device coupled to the processing device, the memory device having instructions stored thereon that, in response to execution by the processing device, cause the processing device to:
   identify, by a secondary database, a chunk of records in the secondary database;
   transmit, by the secondary database, a message to a primary database, the message identifying the chunk of records, the message also inquiring as to whether any records of the chunk of records are delete-able from the secondary database;
   in response to the message received from the secondary database, determine, by the primary database, whether any records of the chunk of records do not exist or are marked for deletion in the primary database;
   process, by the secondary database, a response to the message, the response being received from the primary database and identifying which records of the chunk of records can be deleted by the secondary database;
   delete, by the secondary database, each record of the chunk of records from the secondary database that the message identified;
   repeat, by the secondary database, the transmitting of messages to the primary database for different chunks of records in the secondary database and the deleting of records from the secondary database that responses to the messages indicated were delete-able; and
   as part of the repeating performing at least one of:
     send, by the secondary database, a next message to the primary database after records identified in a response to an earlier message have been deleted; or
     send, by the secondary database, a next message to the primary database only after a response to one of a maximum permitted number of simultaneous in-flight messages has been received;
   wherein a main memory keeps pages of meta-data for records in the primary database that indicate for at least a portion of the records whether the record is at least one of: deleted or delete-able, and wherein, at any time, only a subset of the records within the primary database are able to have their meta-data on a page in the main memory;
   wherein remaining pages of meta-data for the records in the primary database that indicate whether the record is at least one of: deleted or delete-able are stored in non-volatile mass storage;
   wherein frequently accessed pages of meta-data in the non-volatile mass storage replace lesser used pages of meta-data in the main memory;
   wherein a software thread invokes a bloom filter to determine which ones of the records in the primary database have meta-data in the main memory that indicates whether the record is at least one of: deleted or delete-able; and
   wherein, if the bloom filter indicates that the record does not have meta-data in main memory that indicates whether the record is at least one of: deleted or delete-able, the software thread determines that, for purposes of generating the response, the record is not to be regarded as any of: deleted or delete-able.

2. The apparatus of claim 1, the memory device having instructions stored thereon that, in response to execution by the processing device, cause the processing device to:
   identify, by the secondary database, a second chunk of records in the secondary database;
   send, by the secondary database, a second message to the primary database that identifies the second chunk of records and inquires whether any records of the second chunk of records are delete-able;
   process, by the secondary database, a second response to the second message, the second response being received from the primary database, the second response indicating which records of the second chunk of records are delete-able; and
   delete, by the secondary database, each record of the second chunk of records from the secondary database that the second message indicated was delete-able.

3. The apparatus of claim 1, the memory device having instructions stored thereon that, in response to execution by the processing device, cause the processing device to:
   change a rate at which the messages are transmitted based on a primary database's usage.

4. The apparatus of claim 1, the memory device having instructions stored thereon that, in response to execution by the processing device, cause the processing device to:
   change a number of records identified in the messages based on a primary database's usage.

5. The apparatus of claim 1, the memory device having instructions stored thereon that, in response to execution by the processing device, cause the processing device to:
   in another message sent by the secondary database to the primary database, confirm deletion from the secondary database of each record of the chunk of records the response indicated was delete-able.

6. The apparatus of claim 5, wherein the another message is a subsequent message that identifies a second chunk of records and inquires whether any records of the second chunk of records are deleted by the primary database or marked for deletion by the primary database.

7. The apparatus of claim 1, wherein at least one of the records that the response did not indicate was delete-able had associated meta-data in the primary database that indicated that the at least one of the records was deleted or delete-able when the response was generated, and wherein, the associated meta-data was not present in a main memory of a computer that executed the software thread that determined which ones of the records of the chunk were to be identified in the response as being delete-able.

8. The apparatus of claim 7, wherein the main memory keeps pages of meta-data for records in the primary database that indicate for each of the records whether the record is at least one of: deleted; delete-able, and wherein, at any time, only a subset of the records within the primary database are able to have their meta-data on a page in the main memory.

9. A computer-implemented method, comprising:
   identifying, by a secondary storage system, a chunk of records in the secondary storage system;
   sending a message to a primary storage system that identifies the chunk of records and asks whether any records of the chunk of records are delete-able;
   transmitting, by the secondary storage system, a message to a primary storage system, the message identifying the chunk of records, the message also inquiring as to whether any records of the chunk of records are delete-able from the secondary storage system;

in response to the message received from the secondary storage system, determining, by the primary storage system, whether any records of the chunk of records do not exist or are marked for deletion in the primary storage system;

processing, by the secondary storage system, a response to the message, the response being received from the primary storage system and identifying which records of the chunk of records can be deleted by the secondary storage system;

deleting, by the secondary storage system, each record of the chunk of records from the secondary storage system that the message identified;

repeat, by the secondary storage system, the transmitting of messages to the primary storage system for different chunks of records in the secondary storage system and the deleting of records from the secondary storage system that responses to the messages indicated were delete-able; and as part of the repeating performing at least one of:

send, by the secondary storage system, a next message to the primary storage system after records identified in a response to an earlier message have been deleted; or send, by the secondary storage system, a next message to the primary storage system only after a response to one of a maximum permitted number of simultaneous in-flight messages has been received;

wherein a main memory keeps pages of meta-data for records in the primary storage system that indicate for at least a portion of the records whether the record is at least one of: deleted or delete-able, and wherein, at any time, only a subset of the records within the primary storage system are able to have their meta-data on a page in the main memory;

wherein remaining pages of meta-data for the records in the primary storage system that indicate whether the record is at least one of: deleted or delete-able are stored in non-volatile mass storage;

wherein frequently accessed pages of meta-data in the non-volatile mass storage replace lesser used pages of meta-data in the main memory;

wherein a software thread invokes a bloom filter to determine which ones of the records in the primary storage system have meta-data in the main memory that indicates whether the record is at least one of: deleted or delete-able; and wherein, if the bloom filter indicates that the record does not have meta-data in main memory that indicates whether the record is at least one of: deleted or delete-able, the software thread determines that, for purposes of generating the response, the record is not to be regarded as any of: deleted or delete-able.

10. The computer-implemented method of claim 9, comprising:

identifying, by the secondary storage system, a second chunk of records in the secondary storage system;

sending, by the secondary storage system, a second message to the primary storage system that identifies the second chunk of records and inquires whether any records of the second chunk of records are delete-able;

processing, by the secondary storage system, a second response to the second message, the second response being received from the primary storage system and indicating which records of the second chunk of records are delete-able; and deleting, by the secondary storage system, each record of the second chunk of records from the secondary storage system that the second response indicated was delete-able.

11. The computer-implemented method of claim 9, comprising:

changing a rate at which the messages are sent based on a primary storage system's usage.

12. The computer-implemented method of claim 9, comprising:

changing a number of records identified in the messages based on a primary storage system's usage.

13. The computer-implemented method of claim 9, comprising:

in another message sent by the secondary storage system to the primary storage system, confirming deletion from the secondary storage system of each record of the chunk of records the response indicated was delete-able.

14. The computer-implemented method of claim 13, wherein:

the another message is a subsequent message that identifies a second chunk of records and inquires whether any records of the second chunk of records are deleted by the primary storage system or marked for deletion by the primary storage system.

15. The computer-implemented method of claim 9, wherein:

at least one of the records that the response did not indicate was delete-able had associated meta-data in the primary storage system that indicated that the at least one of the records was deleted or delete-able when the response was generated, and wherein, the associated meta-data was not present in a main memory of a computer that executed a software thread that determined which ones of the records of the chunk were to be identified in the response as being delete-able.

16. The computer-implemented method of claim 15, wherein:

the main memory keeps pages of meta-data for records in the primary storage system that indicate for each of the records whether the record is at least one of: deleted or delete-able, and wherein, at any time, only a subset of the records within the primary storage system are able to have their meta-data on a page in the system memory.

17. A tangible, non-transitory computer-readable storage medium having instructions stored thereon which, when executed by a processing device, cause the processing device to:

identify a chunk of records in a secondary database;

identify, by a secondary database, a chunk of records in the secondary database;

transmit, by the secondary database, a message to a primary database, the message identifying the chunk of records, the message also inquiring as to whether any records of the chunk of records are delete-able from the secondary database;

in response to the message received from the secondary database, determine, by the primary database, whether any records of the chunk of records do not exist or are marked for deletion in the primary database;

process, by the secondary database, a response to the message, the response being received from the primary database and identifying which records of the chunk of records can be deleted by the secondary database;

delete, by the secondary database, each record of the chunk of records from the secondary database that the message identified;

repeat, by the secondary database, the transmitting of messages to the primary database for different chunks of records in the secondary database and the deleting of records from the secondary database that responses to the messages indicated were delete-able; and as part of the repeating performing at least one of:
send, by the secondary database, a next message to the primary database after records identified in a response to an earlier message have been deleted; or
send, by the secondary database, a next message to the primary database only after a response to one of a maximum permitted number of simultaneous in-flight messages has been received;

wherein a main memory keeps pages of meta-data for records in the primary database that indicate for at least a portion of the records whether the record is at least one of: deleted or delete-able, and wherein, at any time, only a subset of the records within the primary database are able to have their meta-data on a page in the main memory;

wherein remaining pages of meta-data for the records in the primary database that indicate whether the record is at least one of: deleted or delete-able are stored in non-volatile mass storage;

wherein frequently accessed pages of meta-data in the non-volatile mass storage replace lesser used pages of meta-data in the main memory;

wherein a software thread invokes a bloom filter to determine which ones of the records in the primary database have meta-data in the main memory that indicates whether the record is at least one of: deleted or delete-able; and wherein, if the bloom filter indicates that the record does not have meta-data in main memory that indicates whether the record is at least one of: deleted or delete-able, the software thread determines that, for purposes of generating the response, the record is not to be regarded as any of: deleted or delete-able.

18. The tangible, non-transitory computer-readable storage medium of claim 17, having instructions stored thereon which, when executed by the processing device, cause the processing device to:
identify, by the secondary database, a second chunk of records in the secondary database;
send, by the secondary database, a second message to the primary database that identifies the second chunk of records and inquires whether any records of the second chunk of records are delete-able;
process, by the secondary database, a second response to the second message, the second response being received from the primary database and indicating which records of the second chunk of records are delete-able; and
delete, by the secondary database, each record of the second chunk of records from the secondary database that the second message indicated was delete-able.

19. The tangible, non-transitory computer-readable storage medium of claim 17, having instructions stored thereon which, when executed by the processing device, cause the processing device to:
change a rate at which the messages are sent based on a primary database's usage.

20. The tangible, non-transitory computer-readable storage medium of claim 17, having instructions stored thereon which, when executed by the processing device, cause the processing device to:
change a number of records identified in the messages based on a primary database's usage.

21. The tangible, non-transitory computer-readable storage medium of claim 17, having instructions stored thereon which, when executed by the processing device, cause the processing device to:
in another message sent by the secondary database to the primary database, confirm deletion from the secondary database of each record of the chunk of records the response indicated was delete-able.

* * * * *